United States Patent
Zhao et al.

(10) Patent No.: US 10,064,078 B2
(45) Date of Patent: Aug. 28, 2018

(54) WIRELESS COMMUNICATIONS METHOD, USER EQUIPMENT, AND NETWORK NODE

(71) Applicant: Huawei Technologies Co., Ltd., Shenzhen, Guangdong (CN)

(72) Inventors: Chao Zhao, Shenzhen (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 122 days.

(21) Appl. No.: 14/962,983

(22) Filed: Dec. 8, 2015

(65) Prior Publication Data

US 2016/0095008 A1   Mar. 31, 2016

Related U.S. Application Data

(63) Continuation of application No. PCT/CN2013/077035, filed on Jun. 9, 2013.

(51) Int. Cl.
  *H04W 24/08*   (2009.01)
  *H04W 36/00*   (2009.01)
  (Continued)

(52) U.S. Cl.
  CPC ....... *H04W 24/08* (2013.01); *H04W 36/0083* (2013.01); *H04W 48/20* (2013.01); *H04W 72/085* (2013.01); *H04W 76/27* (2018.02)

(58) Field of Classification Search
  CPC ... H04W 24/08; H04W 76/27; H04W 72/085; H04W 48/20; H04W 36/0083
  See application file for complete search history.

(56) References Cited

U.S. PATENT DOCUMENTS 5,701,585 A * 12/1997 Kallin ................. H04W 36/30
                                                455/436
5,974,320 A * 10/1999 Ward ................ H04W 36/0061
                                                455/432.1
(Continued)

FOREIGN PATENT DOCUMENTS

CN        102045686 A     5/2011
CN        102783204 A    11/2012
(Continued)

OTHER PUBLICATIONS

"Mobility support across carrier types", Huawei, HiSilicon, 3GPP TSG RAN WG1 Meeting #73, May 20-24, 2013, 4 pages, R1-131840.

(Continued)

*Primary Examiner* — Phuc Tran

(57) ABSTRACT

A wireless communications method, user equipment, and a network node are disclosed. The method includes: receiving, by user equipment, a message sent by a first network node, where the message includes measurement instruction information and connection indication information; measuring, by the user equipment in the RRC-IDLE mode, the neighboring cells according to the measurement instruction information, and obtaining measurement results; and selecting, by the user equipment, at least one to-be-connected cell from the neighboring cells according to the connection indication information and the measurement results, and keeping camping on the cell of the first network node when the user equipment is in the RRC-IDLE mode. Embodiments of the present invention can advance a time at which a new cell is found.

20 Claims, 15 Drawing Sheets

(51) Int. Cl.
*H04W 48/20* (2009.01)
*H04W 72/08* (2009.01)
*H04W 76/27* (2018.01)

(56) References Cited

U.S. PATENT DOCUMENTS

| | | | | |
|---|---|---|---|---|
| 8,483,684 B2* | 7/2013 | Jung | ............... | H04W 48/08 |
| | | | | 455/411 |
| 8,842,546 B2* | 9/2014 | Chen | ............... | H04W 36/08 |
| | | | | 370/241 |
| 9,088,921 B2* | 7/2015 | Kazmi | ............... | H04W 36/0088 |
| 9,137,697 B2* | 9/2015 | Jung | ............... | H04W 24/10 |
| 9,294,950 B2* | 3/2016 | Futaki | ............... | H04W 24/02 |
| 9,445,261 B2* | 9/2016 | Yi | ............... | H04W 12/02 |
| 9,635,565 B2* | 4/2017 | Futaki | ............... | H04W 24/02 |
| 2008/0014957 A1 | 1/2008 | Ore | | |
| 2010/0184434 A1* | 7/2010 | Jeong | ............... | H04W 36/0083 |
| | | | | 455/435.2 |
| 2010/0190488 A1* | 7/2010 | Jung | ............... | H04W 24/10 |
| | | | | 455/424 |
| 2011/0183662 A1 | 7/2011 | Lee et al. | | |
| 2013/0010620 A1* | 1/2013 | Dinan | ............... | H04W 76/025 |
| | | | | 370/252 |
| 2013/0072182 A1 | 3/2013 | Jung et al. | | |
| 2013/0196650 A1 | 8/2013 | Futaki | | |
| 2014/0341059 A1* | 11/2014 | Jang | ............... | H04W 48/06 |
| | | | | 370/252 |
| 2015/0181481 A1* | 6/2015 | Masini | ............... | H04W 36/32 |
| | | | | 455/436 |
| 2016/0119762 A1* | 4/2016 | Zhu | ............... | H04W 4/10 |
| | | | | 370/312 |
| 2016/0353330 A1* | 12/2016 | Naik | ............... | H04W 36/0022 |

FOREIGN PATENT DOCUMENTS

| | | |
|---|---|---|
| CN | 102948202 A | 2/2013 |
| EP | 2 624 621 A1 | 8/2013 |
| WO | WO 2012/043796 A1 | 4/2012 |

OTHER PUBLICATIONS

"E-UTRA Measurements and Cell Reselection Considerations", Nokia Siemens Networks, Nokia, 3GPP TSG-RAN WG2 Meeting #58bis, Jun. 25-29, 2007, 5 pages, R2-072386.

"Small cell discovery in RRC_IDLE", Potevio, 3GPP TSG RAN WG2 #81, 3 pages, R2-130334.

"3rd Generation Partnership Project; Technical Specification Group Radio Access Network; Evolved Universal Terrestrial Radio Access (E-UTRA); User Equipment (UE) procedures in idle mode (Release 11)", 3GPP TS 36.304 V11.3.0, Mar. 2013, 34 pages.

* cited by examiner

WIRELESS COMMUNICATIONS METHOD, USER EQUIPMENT, AND NETWORK NODE

CROSS-REFERENCE TO RELATED APPLICATIONS

This application is a continuation of International Application No. PCT/CN2013/077035, filed on Jun. 9, 2013, which is hereby incorporated by reference in its entirety.

TECHNICAL FIELD

The present invention relates to the field of wireless communications, and in particular, to a wireless communications method, user equipment, and a network node.

BACKGROUND

With the development of mobile Internet, terminal users have an increasingly high requirement on bandwidths. A heterogeneous network (HetNet) is put forward to satisfy hotspot scenario and indoor communication requirements in an advanced evolved system (LTE-Advanced), and a main implementation manner is to introduce some base stations having small coverage and low transmit power into a conventional network structure, where the base stations are referred to as transmission points (TP), and a cell covered by a transmission point is usually referred to as a small cell. In this way, when user equipment (UE) moves to a small cell covered by a transmission point, a service of the UE may be handed over to the small cell covered by the transmission point, so as to achieve objectives of increasing a system capacity and increasing a user throughput.

For the HetNet network, if UE that initially camps on a base station and that is in an RRC-IDLE mode (RRC-IDLE) needs to receive downlink data from a network or needs to transmit uplink data, the UE needs to establish a connection to the base station. When the UE is within coverage of a TP, in order to offload traffic to a small cell of the TP, the UE needs to measure, under a precondition that the UE establishes a connection to the base station, a cell of the TP according to a radio resource control connection re-configuration message sent by the base station, and reports a measurement result.

If UE that initially camps on a TP and that is in an RRC-IDLE mode needs to receive downlink data from a network or needs to transmit uplink data, the UE needs to establish a connection to the TP. When the UE is within coverage of a base station, in order to balance load into a cell of the base station, the UE needs to measure, in a case in which the UE establishes a connection to the TP, a cell of the base station according to a radio resource control connection re-configuration message sent by the TP, and reports a measurement result.

In the prior art, UE performs cell measurement and reports a measurement result all under a precondition that the UE establishes a connection to a base station or a TP, and a time at which the UE finds a new cell that can establish a connection to the UE is relatively late.

SUMMARY

In view of this, embodiments of the present invention provide a wireless communications method, user equipment, and a network node, which can advance a time at which a new cell is found.

A first aspect of the embodiments of the present invention provides a wireless communications method, where the wireless communications method may include:

receiving, by user equipment, a message sent by a first network node, where the message includes measurement instruction information and connection indication information, the measurement instruction information is used to instruct the user equipment to measure neighboring cells, the connection indication information is used to indicate a condition that a cell parameter of a to-be-connected cell needs to satisfy, the to-be-connected cell is included in the neighboring cells, a network node corresponding to the to-be-connected cell can establish a connection to the user equipment, and the user equipment is in an RRC-IDLE mode and camps on a cell of the first network node;

measuring, by the user equipment in the RRC-IDLE mode, the neighboring cells according to the measurement instruction information, and obtaining measurement results; and selecting, by the user equipment, at least one to-be-connected cell from the neighboring cells according to the connection indication information and the measurement results, and keeping camping on the cell of the first network node when the user equipment is in the RRC-IDLE mode.

With reference to the first aspect, in a first possible implementation manner, the method in this embodiment of the present invention further includes:

when camping on the cell of the first network node, initiating, by the user equipment, random access to the first network node, and establishing a radio resource control connection to the first network node; and sending, by the user equipment, cell information of the at least one selected to-be-connected cell to the first network node, where a time at which the cell information of the to-be-connected cell is sent may be any one of the following times:

a time at which random access code is sent to the first network node;

a time at which a radio resource control connection request message is sent to the first network node;

a time at which a radio resource control connection complete message is sent to the first network node; and a time before which a measurement configuration sent by the first network node is received.

With reference to the first possible implementation manner of the first aspect, in a second possible implementation manner, after the establishing, by the user equipment, a radio resource control connection to the first network node, the method may further include:

receiving, by the user equipment, cell identifier information and a bearer configuration parameter that are of a second cell and that are sent by the first network node, where the second cell is a cell determined in the at least one to-be-connected cell by the first network node according to the cell information of the at least one to-be-connected cell; and establishing, by the user equipment according to the cell identifier information and the bearer configuration parameter of the second cell, a data radio bearer to a second network node corresponding to the second cell.

With reference to the first possible implementation manner of the first aspect, in a third possible implementation manner, after the establishing, by the user equipment, a radio resource control connection to the first network node, the method may further include:

receiving, by the user equipment, a radio resource control connection release message from the first network node, where the radio resource control connection release message carries cell identifier information of a second cell, where the second cell is a cell determined in the at least one to-be-connected cell by the first network node according to the cell information of the at least one to-be-connected cell; and establishing, by the user equipment, a data radio bearer and a radio resource control connection to a second network node corresponding to the second cell.

With reference to the first aspect, in a fourth possible implementation manner, the method in this embodiment of the present invention may further include:

when camping on the cell of the first network node, determining, by the user equipment, a second cell from the at least one to-be-connected cell; and establishing, by the user equipment, a data radio bearer and a radio resource control connection to a second network node corresponding to the second cell.

With reference to the first aspect, in a fifth possible implementation manner, the method in this embodiment of the present invention may further include:

when camping on the cell of the first network node, determining, by the user equipment, a second cell from the at least one to-be-connected cell according to cell information of the at least one to-be-connected cell;

establishing, by the user equipment, a radio resource control connection to a second network node corresponding to the second cell; and establishing, by the user equipment, a data radio bearer to the first network node.

With reference to the first aspect to the fifth possible implementation manner of the first aspect, in a sixth possible implementation manner, the measurement instruction information includes: physical cell identifiers and/or frequencies of the neighboring cells; and the measuring, by the user equipment in the RRC-IDLE mode, the neighboring cells according to the measurement instruction information, and obtaining measurement results includes:

measuring, by the user equipment in the RRC-IDLE mode, reference signals of cells corresponding to the physical cell identifiers and/or the frequencies, and obtaining strength and/or quality of the reference signals;

or measuring, by the user equipment in the RRC-IDLE mode, discovery signals of cells corresponding to the physical cell identifiers and/or the frequencies, and obtaining signal to interference plus noise ratios of the discovery signals.

With reference to the sixth possible implementation manner of the first aspect, in a seventh possible implementation manner, the measurement instruction information further includes: configuration information of reference signals that need to be measured, and the reference signals measured by the user equipment are reference signals corresponding to the configuration information of the reference signals that need to be measured; or the measurement instruction information further includes: configuration information of discovery signals that need to be measured, and the discovery signals measured by the user equipment are discovery signals corresponding to the configuration information of the discovery signals that need to be measured.

With reference to the sixth or seventh possible implementation manner of the first aspect, in an eighth possible implementation manner, the connection indication information includes: a cell reselection criterion; and the selecting, by the user equipment, at least one to-be-connected cell from the neighboring cells according to the connection indication information and the measurement results includes:

selecting, by the user equipment, from the neighboring cells, a to-be-connected cell whose reference signal has strength and/or quality that satisfies the cell reselection criterion;

or selecting, by the user equipment, from the neighboring cells, a to-be-connected cell whose discovery signal has a signal to interference plus noise ratio that satisfies the cell reselection criterion.

With reference to the sixth or seventh possible implementation manner of the first aspect, in a ninth possible implementation manner, the connection indication information includes at least one of the following information: a minimum strength threshold of a reference signal that a to-be-connected cell needs to satisfy, a minimum quality threshold of a reference signal that a to-be-connected cell needs to satisfy, a minimum signal to interference plus noise ratio threshold of a discovery signal that a to-be-connected cell needs to satisfy, and a maximum quantity N of to-be-connected cells allowed to be selected; and the selecting, by the user equipment, at least one to-be-connected cell from the neighboring cells according to the connection indication information and the measurement results includes:

selecting, by the user equipment, from the neighboring cells, at least one to-be-connected cell that satisfies at least one condition of the following conditions, where the conditions include:

strength of a reference signal is greater than or equal to the minimum strength threshold of a reference signal;

quality of a reference signal is greater than or equal to the minimum quality threshold of a reference signal;

a signal to interference plus noise ratio of a discovery signal is greater than or equal to the minimum signal to interference plus noise ratio threshold of a discovery signal;

being included in N measured neighboring cells whose reference signals have greatest strength;

being included in N measured neighboring cells whose reference signals have best quality; and being included in N neighboring cells whose discovery signals have greatest signal to interference plus noise ratios.

A second aspect of the embodiments of the present invention provides a wireless communications method, where the wireless communications method may include:

creating, by a first network node, a message, where the message includes measurement instruction information and connection indication information, the measurement instruction information is used to instruct user equipment to measure neighboring cells, the connection indication information is used to indicate a condition that a cell parameter of a to-be-connected cell needs to satisfy, the to-be-connected cell is included in the neighboring cells, a network node corresponding to the to-be-connected cell can establish a connection to the user equipment, and the user equipment is in an RRC-IDLE mode and camps on a cell of the first network node; and sending, by the first network node, the message to the user equipment, so that the user equipment selects at least one to-be-connected cell according to the message and keeps camping on the cell of the first network node when the user equipment is in the RRC-IDLE mode.

With reference to the second aspect, in a first possible implementation manner, after the sending, by the first network node, the message to the user equipment, the method further includes:

receiving a random access request initiated by the user equipment, and establishing a radio resource control connection to the user equipment; and receiving, by the first network node, cell information, which is sent by the user equipment, of the at least one to-be-connected cell, where a time at which the cell information of the to-be-connected cell is received may be any one of the following times:

a time at which random access code sent by the user equipment is received;

a time at which a radio resource control connection request message sent by the user equipment is received;

a time at which a radio resource control connection complete message sent by the user equipment is received; and a time before which a measurement configuration is sent to the user equipment.

With reference to the first possible implementation manner of the second aspect, in a second possible implementation manner, after the establishing, by the first network node, a radio resource control connection to the user equipment, the method further includes:

determining a second cell from the at least one to-be-connected cell according to the cell information of the at least one to-be-connected cell, and sending cell identifier information and a bearer configuration parameter of the second cell to the user equipment, so that the user equipment establishes, according to the cell identifier information and the bearer configuration parameter of the second cell, a data radio bearer to a second network node corresponding to the second cell.

With reference to the first possible implementation manner of the second aspect, in a third possible implementation manner, after the establishing, by the first network node, a radio resource control connection to the user equipment, the method further includes:

determining a second cell according to the cell information of the at least one to-be-connected cell, and sending a radio resource control connection release message to the user equipment, where the radio resource control connection release message carries cell identifier information of the second cell, so that the user equipment establishes, according to the cell identifier information of the second cell, a data radio bearer and a radio resource control connection to a second network node corresponding to the second cell.

With reference to the second aspect to the third possible implementation manner of the second aspect, in a fourth possible implementation manner, the measurement instruction information includes: physical cell identifiers and/or frequencies of the neighboring cells, used to instruct the user equipment to measure reference signals of cells corresponding to the physical cell identifiers and/or the frequencies and obtain strength and/or quality of the reference signals, or used to instruct the user equipment to measure discovery signals of cells corresponding to the physical cell identifiers and/or the frequencies and obtain signal to interference plus noise ratios of the discovery signals.

With reference to the fourth possible implementation manner of the second aspect, in a fifth possible implementation manner, the measurement instruction information further includes: configuration information of reference signals that need to be measured, used to instruct the user equipment to measure reference signals corresponding to the configuration information of the reference signals that need to be measured; or the measurement instruction information further includes: configuration information of discovery signals that need to be measured, used to instruct the user equipment to measure discovery signals corresponding to the configuration information of the discovery signals that need to be measured.

With reference to the fourth or fifth possible implementation manner of the second aspect, in a sixth possible implementation manner, the connection indication information includes: a cell reselection criterion, used to instruct the user equipment to select, from the neighboring cells, a to-be-connected cell whose reference signal has strength and/or quality that satisfies the cell reselection criterion, or used to instruct the user equipment to select, from the neighboring cells, a to-be-connected cell whose discovery signal has a signal to interference plus noise ratio that satisfies the cell reselection criterion.

With reference to the fourth or fifth possible implementation manner of the second aspect, in a seventh possible implementation manner, the connection indication information includes at least one of the following information: a minimum strength threshold of a reference signal that a to-be-connected cell needs to satisfy, a minimum quality threshold of a reference signal that a to-be-connected cell needs to satisfy, a minimum signal to interference plus noise ratio threshold of a discovery signal that a to-be-connected cell needs to satisfy, and a maximum quantity N of to-be-connected cells allowed to be selected, to instruct the user equipment to select, from the neighboring cells, a to-be-connected cell that satisfies at least one condition of the following conditions, where the conditions include:

strength of a reference signal is greater than or equal to the minimum strength threshold of a reference signal;

quality of a reference signal is greater than or equal to the minimum quality threshold of a reference signal;

a signal to interference plus noise ratio of a discovery signal is greater than or equal to the minimum signal to interference plus noise ratio threshold of a discovery signal;

being included in N measured neighboring cells whose reference signals have greatest strength;

being included in N measured neighboring cells whose reference signals have best quality; and being included in N neighboring cells whose discovery signals have greatest signal to interference plus noise ratios.

A third aspect of the embodiments of the present invention provides user equipment, where the user equipment may include:

a receiving module, configured to: when the user equipment is in an RRC-IDLE mode and camps on a cell of a first network node, receive a message sent by the first network node, where the message includes measurement instruction information and connection indication information, the measurement instruction information is used to instruct the user equipment to measure neighboring cells, the connection indication information is used to indicate a condition that a cell parameter of a to-be-connected cell needs to satisfy, the to-be-connected cell is included in the neighboring cells, and a network node corresponding to the to-be-connected cell can establish a connection to the user equipment;

a measurement module, configured to: when the user equipment is in the RRC-IDLE mode, measure the neighboring cells according to the measurement instruction information received by the receiving module, and obtain measurement results; and a first selection module, configured to select at least one to-be-connected cell from the neighboring cells according to the connection indication information received by the receiving module and the measurement results obtained by the measurement module, and keep the user equipment camping on the cell of the first network node when the user equipment is in the RRC-IDLE mode.

With reference to the third aspect, in a first possible implementation manner, the user equipment in this embodiment of the present invention further includes:

a first connection establishment module, configured to initiate random access to the first network node, establish a radio resource control connection to the first network node, and send cell information of the at least one to-be-connected cell selected by the first selection module to the first network node, where a time at which the cell information of the to-be-connected cell is sent may be any one of the following times:

a time at which random access code is sent to the first network node;

a time at which a radio resource control connection request message is sent to the first network node;

a time at which a radio resource control connection complete message is sent to the first network node; and a time before which a measurement configuration sent by the first network node is received.

With reference to the first possible implementation manner of the third aspect, in a second possible implementation manner, the receiving module is further configured to receive cell identifier information and a bearer configuration parameter that are of a second cell and that are sent by the first network node, where the second cell is a cell determined in the at least one to-be-connected cell by the first network node according to the cell information of the at least one to-be-connected cell; and the first connection establishment module is further configured to establish, according to the cell identifier information and the bearer configuration parameter that are of the second cell and that are received by the receiving module, a data radio bearer to a second network node corresponding to the second cell.

With reference to the first possible implementation manner of the third aspect, in a third possible implementation manner, the receiving module is further configured to receive a radio resource control connection release message from the first network node, where the radio resource control connection release message carries cell identifier information of a second cell, where the second cell is a cell determined in the at least one to-be-connected cell by the first network node according to the cell information of the at least one to-be-connected cell; and the first connection establishment module is further configured to establish, according to the cell identifier information of the second cell that is received by the receiving module, a data radio bearer and a radio resource control connection to a second network node corresponding to the second cell.

With reference to the third aspect, in a fourth possible implementation manner, the user equipment in this embodiment of the present invention may further include:

a second selection module, configured to: when the user equipment camps on the cell of the first network node, determine a second cell from the at least one to-be-connected cell according to cell information of the at least one to-be-connected cell selected by the first selection module, where the user equipment further includes:

a second connection establishment module, configured to establish a data radio bearer and a radio resource control connection to a second network node corresponding to the second cell determined by the second selection module.

With reference to the third aspect, in a fifth possible implementation manner, the user equipment in this embodiment of the present invention may further include:

a second selection module, further configured to: when the user equipment camps on the cell of the first network node, determine a second cell from the at least one to-be-connected cell according to cell information of the at least one to-be-connected cell selected by the first selection module, where the user equipment further includes:

a third connection establishment module, configured to establish a radio resource control connection to a second network node corresponding to the second cell determined by the second selection module, and establish a data radio bearer to the first network node.

With reference to the third aspect to the fifth possible implementation manner of the third aspect, in a sixth possible implementation manner, the measurement instruction information includes: physical cell identifiers and/or frequencies of the neighboring cells; and the measurement module is specifically configured to: when the user equipment is in the RRC-IDLE mode, measure reference signals of cells corresponding to the physical cell identifiers and/or the frequencies, and obtain strength and/or quality of the reference signals; or when the user equipment is in the RRC-IDLE mode, measure discovery signals of cells corresponding to the physical cell identifiers and/or the frequencies, and obtain signal to interference plus noise ratios of the discovery signals.

With reference to the sixth possible implementation manner of the third aspect, in a seventh possible implementation manner, the measurement instruction information further includes: configuration information of reference signals that need to be measured, and the reference signals measured by the measurement module are reference signals corresponding to the configuration information of the reference signals that need to be measured; or the measurement instruction information further includes: configuration information of discovery signals that need to be measured, and the discovery signals measured by the measurement module are discovery signals corresponding to the configuration information of the discovery signals that need to be measured.

With reference to the sixth or seventh possible implementation manner of the third aspect, in an eighth possible implementation manner, the connection indication information includes: a cell reselection criterion; and the first selection module is specifically configured to select, from the neighboring cells, a to-be-connected cell whose reference signal has strength and/or quality that satisfies the cell reselection criterion, or select, from the neighboring cells, a to-be-connected cell whose discovery signal has a signal to interference plus noise ratio that satisfies the cell reselection criterion.

With reference to the sixth or seventh possible implementation manner of the third aspect, in a ninth possible implementation manner, the connection indication information includes at least one of the following information: a minimum strength threshold of a reference signal that a to-be-connected cell needs to satisfy, a minimum quality threshold of a reference signal that a to-be-connected cell needs to satisfy, a minimum signal to interference plus noise ratio threshold of a discovery signal that a to-be-connected cell needs to satisfy, and a maximum quantity N of to-be-connected cells allowed to be selected; and the first selection module is specifically configured to select, from the neighboring cells, a to-be-connected cell that satisfies at least one condition of the following conditions, where the conditions include:

strength of a reference signal is greater than or equal to the minimum strength threshold of a reference signal;

quality of a reference signal is greater than or equal to the minimum quality threshold of a reference signal;

a signal to interference plus noise ratio of a discovery signal is greater than or equal to the minimum signal to interference plus noise ratio threshold of a discovery signal;

being included in N measured neighboring cells whose reference signals have greatest strength;

being included in N measured neighboring cells whose reference signals have best quality; and being included in N neighboring cells whose discovery signals have greatest signal to interference plus noise ratios.

A fourth aspect of the embodiments of the present invention provides a first network node, where the first network node may include:

a creation module, configured to create a message, where the message includes measurement instruction information and connection indication information, the measurement instruction information is used to instruct user equipment to measure neighboring cells, the connection indication information is used to indicate a condition that a cell parameter of a to-be-connected cell needs to satisfy, the to-be-connected cell is included in the neighboring cells, a network node corresponding to the to-be-connected cell can establish a connection to the user equipment, and the user equipment is in an RRC-IDLE mode and camps on a cell of the first network node; and a sending module, configured to send the message created by the creation module to the user equipment, so that the user equipment selects at least one to-be-connected cell according to the message and keeps camping on the cell of the first network node when the user equipment is in the RRC-IDLE mode.

With reference to the fourth aspect, in a first possible implementation manner, the first network node in this embodiment of the present invention further includes:

a receiving module, configured to receive a random access request initiated by the user equipment, and establish a radio resource control connection to the user equipment; and receive cell information, which is sent by the user equipment, of the at least one to-be-connected cell from the user equipment, where a time at which the receiving module receives the cell information of the to-be-connected cell may be any one of the following times:

a time at which random access code sent by the user equipment is received;

a time at which a radio resource control connection request message sent by the user equipment is received;

a time at which a radio resource control connection complete message sent by the user equipment is received; and a time before which a measurement configuration is sent to the user equipment.

With reference to the first possible implementation manner of the fourth aspect, in a second possible implementation manner, the first network node further includes:

a selection module, configured to determine a second cell from the at least one to-be-connected cell according to the cell information, which is received by the receiving module, of the at least one to-be-connected cell, where the sending module is further configured to send cell identifier information and a bearer configuration parameter of the second cell determined by the selection module to the user equipment, so that the user equipment establishes, according to the cell identifier information and the bearer configuration parameter of the second cell, a data radio bearer to a second network node corresponding to the second cell.

With reference to the first possible implementation manner of the fourth aspect, in a third possible implementation manner, the first network node in this embodiment of the present invention further includes:

a selection module, configured to determine a second cell from the at least one to-be-connected cell according to the cell information, which is received by the receiving module, of the at least one to-be-connected cell, where the sending module is further configured to send a radio resource control connection release message to the user equipment, where the radio resource control connection release message carries cell identifier information of the second cell, so that the user equipment establishes, according to the cell identifier information of the second cell, a data radio bearer and a radio resource control connection to a second network node corresponding to the second cell.

With reference to the fourth aspect to the third possible implementation manner of the fourth aspect, in a fourth possible implementation manner, the measurement instruction information includes: physical cell identifiers and/or frequencies of the neighboring cells, used to instruct the user equipment to measure reference signals of cells corresponding to the physical cell identifiers and/or the frequencies and obtain strength and/or quality of the reference signals, or used to instruct the user equipment to measure discovery signals of cells corresponding to the physical cell identifiers and/or the frequencies and obtain signal to interference plus noise ratios of the discovery signals.

With reference to the fourth possible implementation manner of the fourth aspect, in a fifth possible implementation manner, the measurement instruction information further includes: configuration information of reference signals that need to be measured, used to instruct the user equipment to measure reference signals corresponding to the configuration information of the reference signals that need to be measured; or the measurement instruction information further includes: configuration information of discovery signals that need to be measured, used to instruct the user equipment to measure discovery signals corresponding to the configuration information of the discovery signals that need to be measured.

With reference to the fourth or fifth possible implementation manner of the fourth aspect, in a sixth possible implementation manner, the connection indication information includes: a cell reselection criterion, used to instruct the user equipment to select, from the neighboring cells, a to-be-connected cell whose reference signal has strength and/or quality that satisfies the cell reselection criterion, or used to instruct the user equipment to select, from the neighboring cells, a to-be-connected cell whose discovery signal has a signal to interference plus noise ratio that satisfies the cell reselection criterion.

With reference to the fourth or fifth possible implementation manner of the fourth aspect, in a seventh possible implementation manner, the connection indication information includes at least one of the following information: a minimum strength threshold of a reference signal that a to-be-connected cell needs to satisfy, a minimum quality threshold of a reference signal that a to-be-connected cell needs to satisfy, a minimum signal to interference plus noise ratio threshold of a discovery signal that a to-be-connected cell needs to satisfy, and a maximum quantity N of to-be-connected cells allowed to be selected, to instruct the user equipment to select, from the neighboring cells, a to-be-connected cell that satisfies at least one condition of the following conditions, where the conditions include:

strength of a reference signal is greater than or equal to the minimum strength threshold of a reference signal;

quality of a reference signal is greater than or equal to the minimum quality threshold of a reference signal;

a signal to interference plus noise ratio of a discovery signal is greater than or equal to the minimum signal to interference plus noise ratio threshold of a discovery signal;

being included in N measured neighboring cells whose reference signals have greatest strength;

being included in N measured neighboring cells whose reference signals have best quality; and being included in N neighboring cells whose discovery signals have greatest signal to interference plus noise ratios.

A fifth aspect of the embodiments of the present invention provides user equipment, which is in an RRC-IDLE mode and camps on a cell of a first network node, where the user equipment includes a receiver and a processor, where the receiver is configured to receive a message sent by the first network node, where the message includes measurement instruction information and connection indication information, the measurement instruction information is used to instruct the user equipment to measure neighboring cells, the connection indication information is used to indicate a condition that a cell parameter of a to-be-connected cell needs to satisfy, the to-be-connected cell is included in the neighboring cells, and a network node corresponding to the to-be-connected cell can establish a connection to the user equipment; and the processor is configured to: when the user equipment is in the RRC-IDLE mode, measure the neighboring cells according to the measurement instruction information received by the receiver, and obtain measurement results; and select at least one to-be-connected cell from the neighboring cells according to the connection indication information received by the receiver and the measurement results obtained by the processor, and keep the user equipment camping on the cell of the first network node when the user equipment is in the RRC-IDLE mode.

With reference to the fifth aspect, in a first possible implementation manner, the user equipment in this embodiment of the present invention further includes:

a transmitter, configured to: when the user equipment camps on the cell of the first network node, initiate random access to the first network node, so that the user equipment establishes a radio resource control connection to the first network node, and send cell information of the at least one selected to-be-connected cell to the first network node, where a time at which the transmitter sends the cell information of the to-be-connected cell may be any one of the following times:

a time at which random access code is sent to the first network node;

a time at which a radio resource control connection request message is sent to the first network node;

a time at which a radio resource control connection complete message is sent to the first network node; and a time before which the receiver receives a measurement configuration sent by the first network node.

With reference to the first possible implementation manner of the fifth aspect, in a second possible implementation manner, the receiver is further configured to receive cell identifier information and a bearer configuration parameter that are of a second cell and that are sent by the first network node, where the second cell is a cell determined in the at least one to-be-connected cell by the first network node according to the cell information of the at least one to-be-connected cell; and the processor is further configured to control, according to the cell identifier information and the bearer configuration parameter of the second cell that are received by the receiver, the user equipment to establish a data radio bearer to a second network node corresponding to the second cell.

With reference to the first possible implementation manner of the fifth aspect, in a third possible implementation manner, the receiver is further configured to receive a radio resource control connection release message from the first network node, where the radio resource control connection release message carries cell identifier information of a second cell, where the second cell is a cell determined in the at least one to-be-connected cell by the first network node according to the cell information of the at least one to-be-connected cell; and the processor is further configured to control, according to the cell identifier information of the second cell that is received by the receiver, the user equipment to establish a data radio bearer and a radio resource control connection to a second network node corresponding to the second cell.

With reference to the fifth aspect, in a fourth possible implementation manner, the processor is further configured to: when the user equipment camps on the cell of the first network node, determine a second cell from the at least one to-be-connected cell, and control the user equipment to establish a data radio bearer and a radio resource control connection to a second network node corresponding to the second cell.

With reference to the fifth aspect, in a fifth possible implementation manner, the processor is further configured to: when the user equipment camps on the cell of the first network node, determine a second cell from the at least one to-be-connected cell according to cell information of the at least one to-be-connected cell; and control the user equipment to establish a radio resource control connection to a second network node corresponding to the second cell, and control the user equipment to establish a data radio bearer to the first network node.

With reference to the fifth aspect to the fifth possible implementation manner of the fifth aspect, in a sixth possible implementation manner, the measurement instruction information includes: physical cell identifiers and/or frequencies of the neighboring cells; and the processor being configured to: when the user equipment is in the RRC-IDLE mode, measure the neighboring cells according to the measurement instruction information received by the receiver, and obtain measurement results specifically includes:

when the user equipment is in the RRC-IDLE mode, measuring, by the processor according to the measurement instruction information received by the receiver, reference signals of cells corresponding to the physical cell identifiers and/or the frequencies, and obtaining strength and/or quality of the reference signals;

or when the user equipment is in the RRC-IDLE mode, measuring, by the processor according to the measurement instruction information received by the receiver, discovery signals of cells corresponding to the physical cell identifiers and/or the frequencies, and obtaining signal to interference plus noise ratios of the discovery signals.

With reference to the sixth possible implementation manner of the fifth aspect, in a seventh possible implementation manner, the measurement instruction information further includes: configuration information of reference signals that need to be measured, and the reference signals measured by the processor are reference signals corresponding to the configuration information of the reference signals that need to be measured; or the measurement instruction information further includes: configuration information of discovery signals that need to be measured, and the discovery signals measured by the processor are discovery signals corresponding to the configuration information of the discovery signals that need to be measured.

With reference to the sixth or seventh possible implementation manner of the fifth aspect, in an eighth possible implementation manner, the connection indication information includes: a cell reselection criterion; and the selecting, by the processor, at least one to-be-connected cell from the neighboring cells according to the connection indication information and the measurement results specifically includes:

selecting, by the processor from the neighboring cells, a to-be-connected cell whose reference signal has strength and/or quality that satisfies the cell reselection criterion; or selecting, by the processor from the neighboring cells, a to-be-connected cell whose discovery signal has a signal to interference plus noise ratio that satisfies the cell reselection criterion.

With reference to the sixth or seventh possible implementation manner of the fifth aspect, in a ninth possible implementation manner, the connection indication information includes at least one of the following information: a minimum strength threshold of a reference signal that a to-be-connected cell needs to satisfy, a minimum quality threshold of a reference signal that a to-be-connected cell needs to satisfy, a minimum signal to interference plus noise ratio threshold of a discovery signal that a to-be-connected cell needs to satisfy, and a maximum quantity N of to-be-connected cells allowed to be selected; and the selecting, by the processor, at least one to-be-connected cell from the neighboring cells according to the connection indication information and the measurement results specifically includes:

selecting, by the processor from the neighboring cells, at least one to-be-connected cell that satisfies at least one condition of the following conditions, where the conditions include:

strength of a reference signal is greater than or equal to the minimum strength threshold of a reference signal;

quality of a reference signal is greater than or equal to the minimum quality threshold of a reference signal;

a signal to interference plus noise ratio of a discovery signal is greater than or equal to the minimum signal to interference plus noise ratio threshold of a discovery signal;

being included in N measured neighboring cells whose reference signals have greatest strength;

being included in N measured neighboring cells whose reference signals have best quality; and being included in N neighboring cells whose discovery signals have greatest signal to interference plus noise ratios.

A sixth aspect of the embodiments of the present invention provides a first network node, where the first network node may include a processor and a transmitter, where the processor is configured to create a message, where the message includes measurement instruction information and connection indication information, the measurement instruction information is used to instruct user equipment to measure neighboring cells, the connection indication information is used to indicate a condition that a cell parameter of a to-be-connected cell needs to satisfy, the to-be-connected cell is included in the neighboring cells, a network node corresponding to the to-be-connected cell can establish a connection to the user equipment, and the user equipment is in an RRC-IDLE mode and camps on a cell of the first network node; and the transmitter is configured to send the message created by the processor to the user equipment, so that the user equipment selects at least one to-be-connected cell according to the message and keeps camping on the cell of the first network node when the user equipment is in the RRC-IDLE mode.

With reference to the sixth aspect, in a first possible implementation manner, the first network node in this embodiment of the present invention further includes:

a receiver, configured to receive a random access request initiated by the user equipment, so that the first network node establishes a radio resource control connection to the user equipment; and receive cell information, which is sent by the user equipment, of the at least one to-be-connected cell from the user equipment, where a time at which the receiver receives the cell information of the to-be-connected cell may be any one of the following times:

a time at which random access code sent by the user equipment is received;

a time at which a radio resource control connection request message sent by the user equipment is received;

a time at which a radio resource control connection complete message sent by the user equipment is received; and a time before which the transmitter sends a measurement configuration to the user equipment.

With reference to the first possible implementation manner of the sixth aspect, in a second possible implementation manner, the processor is further configured to determine a second cell from the at least one to-be-connected cell according to the cell information, which is received by the receiver, of the at least one to-be-connected cell; and the transmitter is further configured to send, to the user equipment, cell identifier information and a bearer configuration parameter of the second cell determined by the processor, so that the user equipment establishes, according to the cell identifier information and the bearer configuration parameter of the second cell, a data radio bearer to a second network node corresponding to the second cell.

With reference to the first possible implementation manner of the sixth aspect, in a third possible implementation manner, the processor is further configured to determine a second cell from the at least one to-be-connected cell according to the cell information, which is received by the receiver, of the at least one to-be-connected cell; and the transmitter is further configured to send a radio resource control connection release message to the user equipment, where the radio resource control connection release message carries cell identifier information of the second cell, so that the user equipment establishes, according to the cell identifier information of the second cell, a data radio bearer and a radio resource control connection to a second network node corresponding to the second cell.

With reference to the sixth aspect to the third possible implementation manner of the sixth aspect, in a fourth possible implementation manner, the measurement instruction information includes: physical cell identifiers and/or frequencies of the neighboring cells, used to instruct the user equipment to measure reference signals of cells corresponding to the physical cell identifiers and/or the frequencies and obtain strength and/or quality of the reference signals, or used to instruct the user equipment to measure discovery signals of cells corresponding to the physical cell identifiers and/or the frequencies and obtain signal to interference plus noise ratios of the discovery signals.

With reference to the fourth possible implementation manner of the sixth aspect, in a fifth possible implementation manner, the measurement instruction information further includes: configuration information of reference signals that need to be measured, used to instruct the user equipment to measure reference signals corresponding to the configuration information of the reference signals that need to be measured; or the measurement instruction information further includes: configuration information of discovery signals that need to be measured, used to instruct the user equipment to measure discovery signals corresponding to the configuration information of the discovery signals that need to be measured.

With reference to the fourth or fifth possible implementation manner of the sixth aspect, in a sixth possible implementation manner, the connection indication information includes: a cell reselection criterion, used to instruct the user equipment to select, from the neighboring cells, a to-be-connected cell whose reference signal has strength and/or quality that satisfies the cell reselection criterion, or used to instruct the user equipment to select, from the neighboring cells, a to-be-connected cell whose discovery signal has a signal to interference plus noise ratio that satisfies the cell reselection criterion.

With reference to the fourth or fifth possible implementation manner of the sixth aspect, in a seventh possible implementation manner, the connection indication information includes at least one of the following information: a minimum strength threshold of a reference signal that a to-be-connected cell needs to satisfy, a minimum quality threshold of a reference signal that a to-be-connected cell needs to satisfy, a minimum signal to interference plus noise ratio threshold of a discovery signal that a to-be-connected cell needs to satisfy, and a maximum quantity N of to-be-connected cells allowed to be selected, to instruct the user equipment to select, from the neighboring cells, a to-be-connected cell that satisfies at least one condition of the following conditions, where the conditions include:

strength of a reference signal is greater than or equal to the minimum strength threshold of a reference signal;

quality of a reference signal is greater than or equal to the minimum quality threshold of a reference signal;

a signal to interference plus noise ratio of a discovery signal is greater than or equal to the minimum signal to interference plus noise ratio threshold of a discovery signal;

being included in N measured neighboring cells whose reference signals have greatest strength;

being included in N measured neighboring cells whose reference signals have best quality; and being included in N neighboring cells whose discovery signals have greatest signal to interference plus noise ratios.

An eighth aspect of the embodiments of the present invention provides a computer storage medium, where a program may be stored in the computer storage medium, and when executed, the program includes all or some steps of the wireless communications method in the embodiments of the present invention.

As can be seen from the foregoing, in some implementation manners of the present invention, when user equipment is in an RRC-IDLE mode, the user equipment measures neighboring cells by using a message sent by a first network node, and obtains measurement results; and selects at least one to-be-connected cell from the neighboring cells of a cell of the first network node according to the message sent by the first network node and the measurement results, where the to-be-connected cell is included in the neighboring cells, and a network node corresponding to the to-be-connected cell can establish a connection to the user equipment. In this way, a time at which a to-be-connected cell that can establish a connection to the UE is found is advanced to a time when the user equipment is in the RRC-IDLE mode, which helps the UE to subsequently directly establish a connection to a network node corresponding to the to-be-connected cell, and a cell handover procedure can be eliminated. In addition, in the embodiments of the present invention, when the UE is in the RRC-IDLE mode, the UE keeps camping on the cell of the first network node, which can avoid a defect that when a camped device of the UE is handed over from the first network node to another network node when the UE is in the RRC-IDLE mode, the UE cannot receive a paging message from the another network node when the UE is in the RRC-IDLE mode and therefore cannot establish a connection to the another network node.

DETAILED DESCRIPTION

Figure 1:
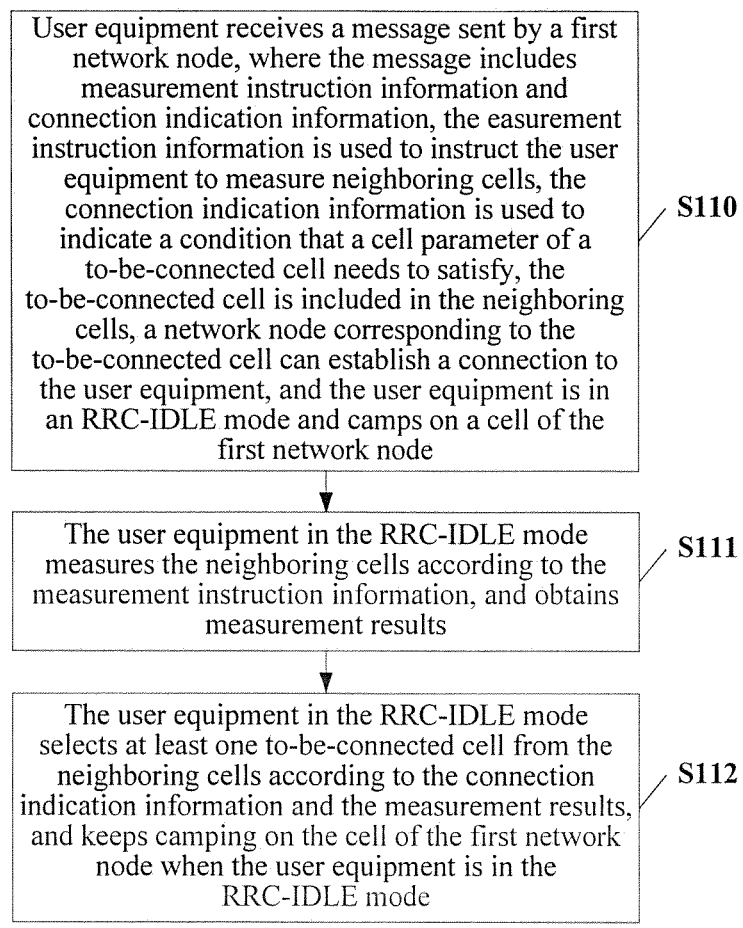
FIG. 1 is a schematic flowchart of an embodiment of a wireless communications method according to the present invention.

FIG. 1 is a schematic flowchart of an embodiment of a wireless communications method according to the present invention. As shown in FIG. 1, the method may include:

Step S110: User equipment receives a message sent by a first network node, where the message includes measurement instruction information and connection indication information, the measurement instruction information is used to instruct the user equipment to measure neighboring cells, the connection indication information is used to indicate a condition that a cell parameter of a to-be-connected cell needs to satisfy, the to-be-connected cell is included in the neighboring cells, a network node corresponding to the to-be-connected cell can establish a connection to the user equipment, and the user equipment is in an RRC-IDLE mode and camps on a cell of the first network node. The cell parameter includes at least one of strength of a reference signal, quality of a reference signal, and a signal to interference plus noise ratio of a cell discovery signal.

In specific implementation, in step S110, the message sent by the first network node and received by the user equipment may be a system broadcast message or another message that can carry the measurement instruction information and the connection indication information.

In specific implementation, the network node corresponding to the to-be-connected cell may establish a control plane connection and/or a user plane connection to the user equipment. Further, the control plane connection includes a radio resource control (Radio Resource Control, RRC) connection; and the user plane connection includes all or some data radio bearers, where the all data radio bearers include all data radio bearers, and the some data radio bearers include uplink data radio bearers and/or downlink data radio bearers, or the some data radio bearers include some protocol layers (which, for example, include only a data link layer, a Media Access Control layer, and a physical layer).

In some feasible implementation manners, the first network node is a base station, and the network node corresponding to the to-be-connected cell is a communications node having a scheduling function, where the communications node having a scheduling function includes a base station (such as a macro base station, a relay base station, a home base station, a small cell, a micro base station, or a picocell base station) or any communications node having a scheduling function.

In some feasible implementation manners, the first network node is a communications node having a scheduling function, and the network node corresponding to the to-be-connected cell is a base station, where the communications node having a scheduling function includes a base station or any communications node having a scheduling function.

In specific implementation, the base station in this embodiment of the present invention includes any one of a macro base station, a relay base station, a home base station, a small cell, and a micro base station.

In some feasible implementation manners, the measurement instruction information includes: physical cell identifiers (Physical Cell Identifier, PCI) and/or frequencies of the neighboring cells, used to instruct the user equipment to measure reference signals of cells corresponding to the physical cell identifiers and/or the frequencies and obtain strength and/or quality of the reference signals, or used to instruct the user equipment to measure discovery signals of cells corresponding to the physical cell identifiers and/or the frequencies and obtain signal to interference plus noise ratios of the discovery signals.

In some feasible implementation manners, in addition to the physical cell identifiers (Physical Cell Identifier, PCI) and/or the frequencies of the neighboring cells, the measurement instruction information further includes: configuration information of reference signals that need to be measured and/or configuration information of discovery signals that need to be measured. The configuration information of the reference signals that need to be measured is used to instruct the user equipment to measure reference signals corresponding to the configuration information of the reference signals; and the configuration information of the discovery signals that need to be measured is used to instruct the user equipment to measure discovery signals corresponding to the configuration information of the discovery signals. The configuration information of the reference signals may include: configuration information of channel state information reference signals (Channel Status Information Reference Signal, CSI-RS). Further, if the measurement instruction information does not include configuration information of CSI-RSs, the user equipment measures cell-specific reference signals (Cell-Specific Reference Signal, CSR) of the cells. The configuration information of the discovery signals may include: configuration information of discovery reference signals (Discovery Reference Signal, DRS) used for cell discovery or track reference signals (Track Reference Signal, TRS). Further, if the measurement instruction information does not include configuration information of DRSs or TRSs, the user equipment measures primary synchronization signals (Primary Synchronization Signal, PSS) and secondary synchronization signals (Secondary Synchronization Signal, SSS) of the cells.

In some feasible implementation manners, the frequencies may include an intra-frequency indication (which is usually 1 bit and is used to instruct the user equipment to perform intra-frequency measurement).

In some feasible implementation manners, the measurement instruction information may further include a measurement time interval indication, used to indicate, to the UE, a time interval at which the neighboring cells are measured, for example, when the measurement time interval is 60 ms, the UE may start measurement of a neighboring cell every 60 ms.

In some feasible implementation manners, the connection indication information includes a cell reselection criterion, used to instruct the user equipment to select, from the neighboring cells, a to-be-connected cell whose reference signal has strength and/or quality that satisfies the cell reselection criterion, or used to instruct the user equipment to select, from the neighboring cells, a to-be-connected cell whose discovery signal has a signal to interference plus noise ratio that satisfies the cell reselection criterion.

In some feasible implementation manners, the connection indication information includes at least one of the following information: a minimum strength threshold of a reference signal that a to-be-connected cell needs to satisfy, a minimum quality threshold of a reference signal that a to-be-connected cell needs to satisfy, a minimum signal to interference plus noise ratio threshold of a discovery signal that a to-be-connected cell needs to satisfy, and a maximum quantity N of to-be-connected cells allowed to be selected, to instruct the user equipment to select, from the neighboring cells, a to-be-connected cell that satisfies at least one condition of the following conditions, where the conditions include:

strength of a reference signal is greater than or equal to the minimum strength threshold of a reference signal;

quality of a reference signal is greater than or equal to the minimum quality threshold of a reference signal;

a signal to interference plus noise ratio of a discovery signal is greater than or equal to the minimum signal to interference plus noise ratio threshold of a discovery signal;

being included in N measured neighboring cells whose reference signals have greatest strength;

being included in N measured neighboring cells whose reference signals have best quality; and being included in N neighboring cells whose discovery signals have greatest signal to interference plus noise ratios.

In specific implementation, the measurement instruction information not only explicitly indicates the included content in the foregoing manner in which the measurement instruction information includes the physical cell identifiers and the frequencies of the neighboring cells, the configuration information of the reference signals, which need to be measured, of the cells, and the configuration information of the discovery signals, which need to be measured, of the cells, but also may indicate the content in an implicit manner, for example, may carry a specific parameter name or carry specific bit information to indicate physical cell identifiers, frequencies, and the like corresponding to the parameter name or the bit information.

In specific implementation, the connection indication information not only indicates the included content in the foregoing manner in which the connection indication information includes the cell reselection criterion, or at least one of a minimum strength threshold of a reference signal that a to-be-connected cell needs to satisfy, a minimum quality threshold of a reference signal that a to-be-connected cell needs to satisfy, a minimum signal to interference plus noise ratio threshold of a discovery signal that a to-be-connected cell needs to satisfy, and a maximum quantity N of to-be-connected cells allowed to be selected, but also may indicate the included content in an implicit manner, for example, may carry a specific parameter name or carry specific bit information or use a message name to indicate a condition that a selected to-be-connected cell needs to satisfy.

Step S111: The user equipment in the RRC-IDLE mode measures the neighboring cells according to the measurement instruction information, and obtains measurement results.

With reference to the foregoing description, when the measurement instruction information includes the physical cell identifiers and/or the frequencies of the neighboring cells (where explicit indication is used herein as an example for description, and in specific implementation, the following step is also applicable to a case in which the measurement instruction information indicates the cell identifiers and/or the frequencies in an implicit manner), step S111 may be specifically as follows:

measuring, by the user equipment in the RRC-IDLE mode, reference signals of cells corresponding to the physical cell identifiers and/or the frequencies, and obtaining strength and/or quality of the reference signals, where as described above, the measured reference signals herein may be at least one of channel state information reference signals and cell-specific reference signals; or measuring, by the user equipment in the RRC-IDLE mode, discovery signals of cells corresponding to the physical cell identifiers and/or the frequencies, and obtaining signal to interference plus noise ratios of the discovery signals, where as described above, the measured discovery signals herein may be at least one of primary synchronization signals, secondary synchronization signals, or other signals used for cell discovery.

Further, when the measurement instruction information includes the configuration information of the reference signals that need to be measured and/the configuration information of the discovery signals that need to be measured, in step S111, when the neighboring cells are measured, the reference signals corresponding to the configuration information of the reference signals that is in the measurement instruction information are measured, and/or the discovery signals corresponding to the configuration information of the discovery signals that is in the measurement instruction information are measured.

Step S112: The user equipment in the RRC-IDLE mode selects at least one to-be-connected cell from the neighboring cells according to the connection indication information and the measurement results, and keeps camping on the cell of the first network node when the user equipment is in the RRC-IDLE mode.

With reference to the foregoing description, when the connection indication information includes the cell reselection criterion (where explicit indication is used herein as an example for description, and in specific implementation, the following step is also applicable to a case in which the connection indication information indicates the cell reselection criterion in an implicit manner), step S111 may be specifically as follows:

selecting, by the user equipment in the RRC-IDLE mode from the neighboring cells, a to-be-connected cell whose reference signal has strength and/or quality that satisfies the cell reselection criterion; or selecting, by the user equipment in the RRC-IDLE mode from the neighboring cells, a to-be-connected cell whose discovery signal has a signal to interference plus noise ratio that satisfies the cell reselection criterion.

When the connection indication information includes at least one of the following information (where explicit indication is used herein as an example for description, and in specific implementation, the following step is also applicable to a case in which the connection indication information indicates the following information in an implicit manner): a minimum strength threshold of a reference signal that a to-be-connected cell needs to satisfy, a minimum quality threshold of a reference signal that a to-be-connected cell needs to satisfy, a minimum signal to interference plus noise ratio threshold of a discovery signal that a to-be-connected cell needs to satisfy, and a maximum quantity N of to-be-connected cells allowed to be selected, step S112 may specifically include:

selecting, by the user equipment, from the neighboring cells, at least one to-be-connected cell that satisfies at least one condition of the following conditions, where the conditions include:

strength of a reference signal is greater than or equal to the minimum strength threshold of a reference signal;

quality of a reference signal is greater than or equal to the minimum quality threshold of a reference signal;

a signal to interference plus noise ratio of a discovery signal is greater than or equal to the minimum signal to interference plus noise ratio threshold of a discovery signal;

being included in N measured neighboring cells whose reference signals have greatest strength;

being included in N measured neighboring cells whose reference signals have best quality; and being included in N neighboring cells whose discovery signals have greatest signal to interference plus noise ratios.

In specific implementation, the user equipment may save cell information of a to-be-connected cell selected from the neighboring cells. The cell information may include at least one of a PCI, frequency information, reference signal received power (Reference Signal Received Power, RSRP), reference signal received quality (Reference Signal Received Quality, RSRQ), CSI-RS configuration information, and DRS configuration information.

As can be known from the foregoing, in some feasible implementation manners of the present invention, when user equipment is in an RRC-IDLE mode, the user equipment measures neighboring cells by using a message sent by a first network node, and obtains measurement results; and selects at least one to-be-connected cell from the neighboring cells of a cell of the first network node according to the message sent by the first network node and the measurement results, where the to-be-connected cell is included in the neighboring cells, and a network node corresponding to the to-be-connected cell can establish a connection to the user equipment. In this way, a time at which a to-be-connected cell that can establish a connection to the UE is found is advanced to a time point when the user equipment is in the RRC-IDLE mode, which helps the UE to subsequently directly establish a connection to a network node corresponding to the to-be-connected cell, and a cell handover procedure can be eliminated. In addition, in this embodiment of the present invention, when the UE is in the RRC-IDLE mode, the UE keeps camping on the cell of the first network node, which can avoid a defect that when a camped device of the UE is handed over from the first network node to another network node when the UE is in the RRC-IDLE mode, the UE cannot receive a paging message from the another network node when the UE is in the RRC-IDLE mode and therefore cannot establish a connection to the another network node.

Figure 2:
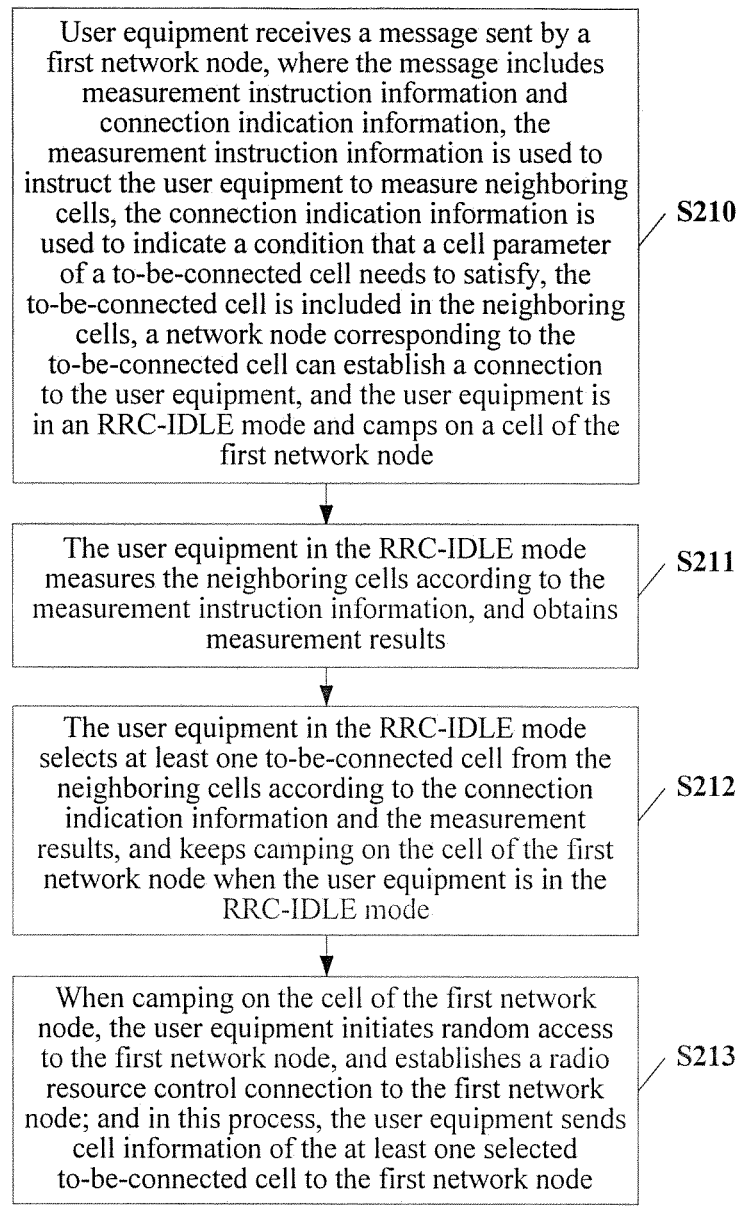
FIG. 2 is a schematic flowchart of another embodiment of a wireless communications method according to the present invention.

FIG. 2 is a schematic flowchart of another embodiment of a wireless communications method according to the present invention. As shown in FIG. 2, the method includes: step S210 to step S212. Step S210 to step S212 are roughly the same as steps S110 to S112 in FIG. 1 respectively, and are not described in detail herein. A main difference between this embodiment and the embodiment shown in FIG. 1 lies in that this embodiment includes:

Step S213: When camping on the cell of the first network node, the user equipment initiates random access to the first network node, and establishes a radio resource control connection to the first network node; and in this process, the user equipment sends cell information of the at least one selected to-be-connected cell to the first network node, where a time at which the cell information of the to-be-connected cell is sent may be any one of the following times:

a time at which random access code is sent to the first network node;

a time at which a radio resource control connection request message is sent to the first network node;

a time at which a radio resource control connection complete message is sent to the first network node; and a time before which a measurement configuration sent by the first network node is received.

Based on the embodiment shown in FIG. 1, this embodiment provides an implementation solution for how and when the user equipment sends, to the first network node, the cell information of the at least one to-be-connected cell selected by the user equipment.

Figure 3:
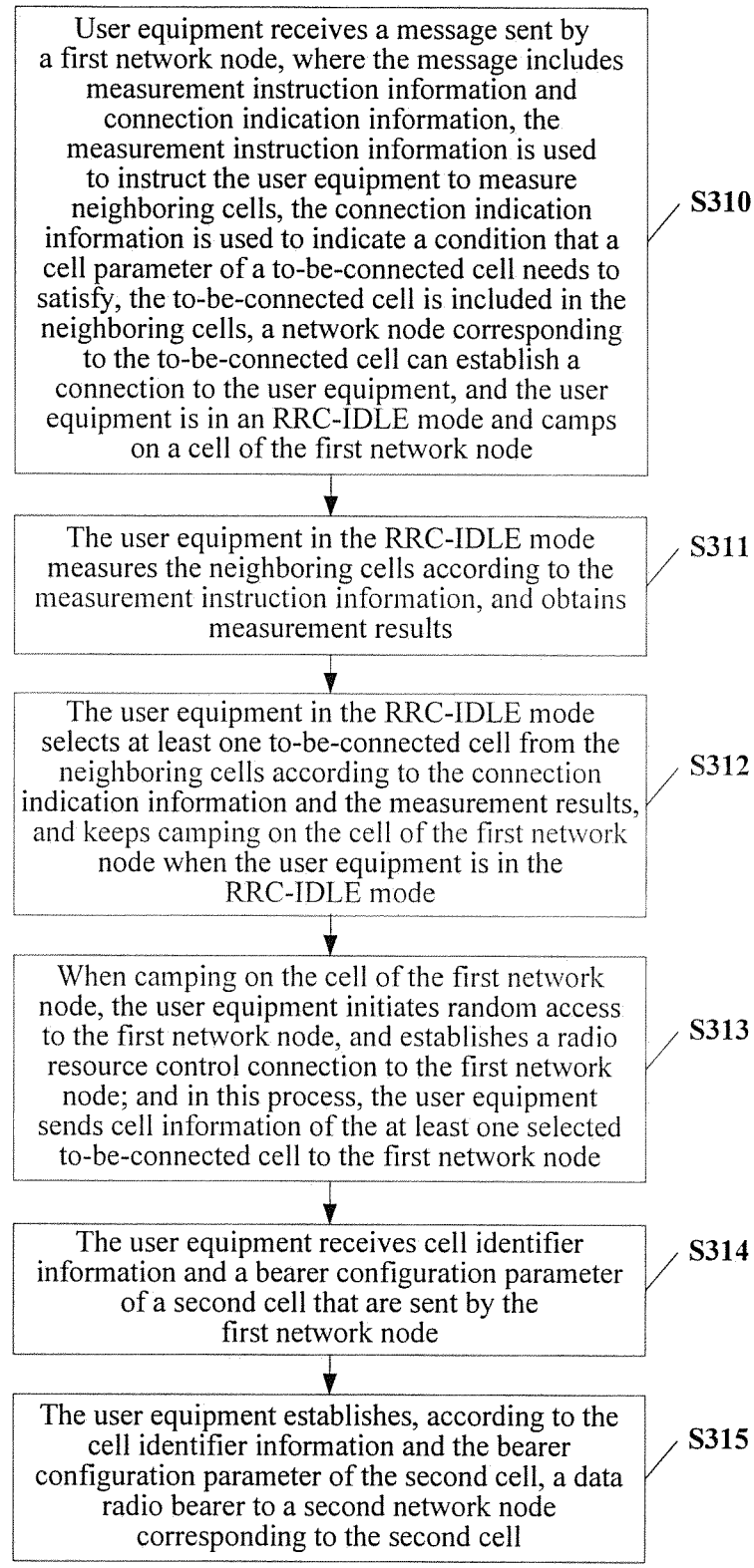
FIG. 3 is a schematic flowchart of another embodiment of a wireless communications method according to the present invention.

FIG. 3 is a schematic flowchart of another embodiment of a wireless communications method according to the present invention. As shown in FIG. 3, the method includes: step S310 to step S313. Step S310 to step S313 are roughly the same as steps S210 to S213 in FIG. 2 respectively, and are not described in detail herein. A main difference between this embodiment and the embodiment shown in FIG. 2 lies in that this embodiment includes:

Step S314: The user equipment receives cell identifier information and a bearer configuration parameter that are of a second cell and that are sent by the first network node, where the second cell is a cell determined in the at least one to-be-connected cell by the first network node according to the cell information of the at least one to-be-connected cell. The cell identifier information may include a physical cell identifier and/or a frequency.

In specific implementation, after the first network node acquires the cell information of the at least one to-be-connected cell from the user equipment, before step S314, the first network node may determine a cell in the at least one to-be-connected cell according to the cell information of the at least one to-be-connected cell, for example, may select a cell having the best reference signal received power as the second cell according to at least one of a PCI, frequency information, reference signal received power (Reference Signal Received Power, RSRP), reference signal received quality (Reference Signal Received Quality, RSRQ), CSI-RS configuration information, and DRS configuration information of the at least one to-be-connected cell, or may randomly select a cell as the second cell according to a PCI.

In some feasible implementation manners, the bearer configuration parameter may include at least one of an uplink bearer configuration parameter and a downlink bearer configuration parameter. The uplink bearer configuration parameter may include an uplink Packet Data Convergence Protocol (Packet Data Convergence Protocol, PDCP) configuration parameter, an uplink radio link control (Radio Link Control, RLC) configuration parameter, an uplink Media Access Control (Media Access Control, MAC) configuration parameter, or an uplink physical layer configuration parameter; and the downlink bearer configuration parameter includes a downlink PDCP configuration parameter, a downlink RLC configuration parameter, a MAC configuration parameter, or a downlink physical layer configuration parameter. In this case, the first network node may add the cell identifier information and the bearer configuration parameter of the selected second cell to a radio resource control connection re-configuration message sent to the UE, to configure the UE to establish a data radio bearer or an uplink data radio bearer or a downlink data radio bearer on a communications node having a scheduling function.

In some feasible implementation manners, the bearer configuration parameter may include only one or more of a physical layer configuration parameter, a MAC layer configuration parameter, an RLC layer configuration parameter, and a PDCP layer configuration parameter. In this case, the first network node may add the cell identifier information and the bearer configuration parameter of the selected second cell to a radio resource control connection re-configuration message sent to the UE, to configure the UE to establish a physical link to a second network node corresponding to the selected second cell, so that the UE receives, by using the second network node, user plane data sent by the first network node and/or the UE sends, by using the second network node, user plane data to the first network node.

Step S315: The user equipment establishes, according to the cell identifier information and the bearer configuration parameter of the second cell, a data radio bearer to a second network node corresponding to the second cell.

In specific implementation, in step S315, the user equipment and the second network node corresponding to the second cell indicated by the identifier information of the second cell configure entities at layers of same protocol stacks according to an indication of the bearer configuration parameter, thereby establishing a data radio bearer to the second network node corresponding to the second cell.

As described above, in step S315, the user equipment may establish all or some data radio bearers to the second network node corresponding to the second cell, where all the data radio bearers include that the bearers are all established in the cell of the second network node, and the some data radio bearers include uplink data radio bearers and/or downlink data radio bearers, or the data radio bearers include some protocol layers (which, for example, include only a data link layer, a Media Access Control layer, and a physical layer).

As can be known from the foregoing, in some feasible implementation manners of the present invention, when user equipment is in an RRC-IDLE mode, the user equipment measures neighboring cells by using a message sent by a first network node, and obtains measurement results; and selects at least one to-be-connected cell from the neighboring cells of a cell of the first network node according to the message sent by the first network node and the measurement results, where the to-be-connected cell is included in the neighboring cells, and a network node corresponding to the to-be-connected cell can establish a connection to the user equipment. In this way, a time at which a to-be-connected cell that can establish a connection to the UE is found is advanced to a time point when the user equipment is in the RRC-IDLE mode, and when initially establishing a data radio bearer, the UE directly establishes the data radio bearer to a second network node corresponding to the to-be-connected cell, thereby eliminating a cell handover procedure. In addition, in this embodiment of the present invention, when the UE is in the RRC-IDLE mode, the UE keeps camping on the cell of the first network node, which can avoid a defect that when a camped device of the UE is handed over from the first network node to another network node when the UE is in the RRC-IDLE mode, the UE cannot receive a paging message from the another network node when the UE is in the RRC-IDLE mode and therefore cannot establish a connection to the another network node.

Figure 4:
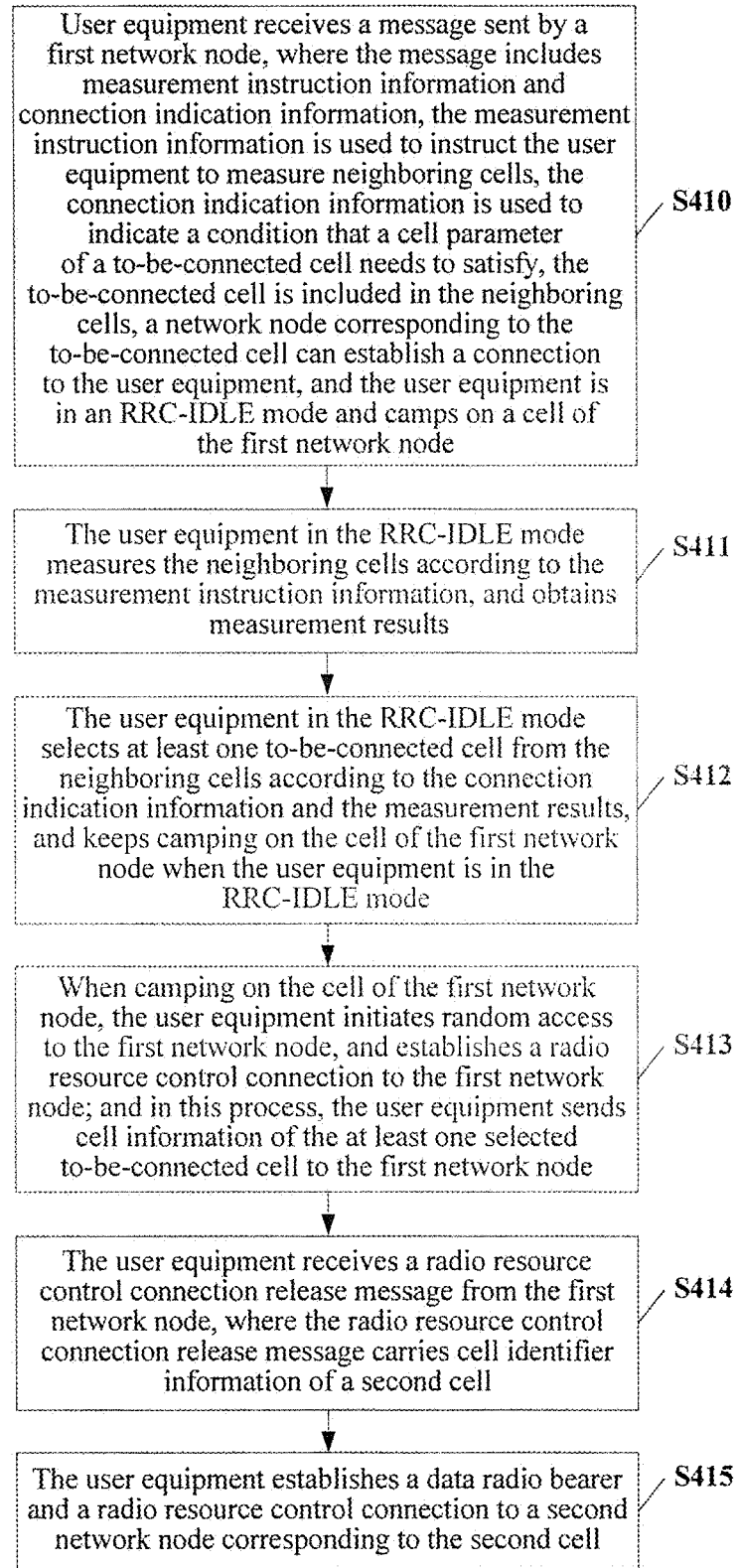
FIG. 4 is a schematic flowchart of another embodiment of a wireless communications method according to the present invention.

FIG. 4 is a schematic flowchart of another embodiment of a wireless communications method according to the present invention. As shown in FIG. 4, the method includes: step S410 to step S413. Step S410 to step S413 are roughly the same as steps S210 to S213 in FIG. 2 respectively, and are not described in detail herein. A main difference between this embodiment and the embodiment shown in FIG. 2 lies in that this embodiment includes:

Step S414: The user equipment receives a radio resource control connection release message from the first network node, where the radio resource control connection release message carries cell identifier information of a second cell, where the second cell is a cell determined in the at least one to-be-connected cell by the first network node according to the cell information of the at least one to-be-connected cell.

In specific implementation, after the first network node acquires the cell information of the at least one to-be-connected cell from the user equipment, before step S414, the first network node may determine a cell in the at least one to-be-connected cell according to the cell information of the at least one to-be-connected cell, for example, may select a cell having the best reference signal received power as the second cell according to at least one of a PCI, frequency information, reference signal received power (Reference Signal Received Power, RSRP), reference signal received quality (Reference Signal Received Quality, RSRQ), CSI-RS configuration information, and DRS configuration information of the at least one to-be-connected cell, or may randomly select a cell as the second cell according to a PCI.

In specific implementation, when sending the radio resource control radio resource control connection release message, the first network node may indicate a release reason, for example, the release reason is that a small cell is found.

Step S415: The user equipment establishes a data radio bearer and a radio resource control connection to a second network node corresponding to the second cell.

In specific implementation, in step S415, the user equipment and the second network node corresponding to the second cell configure entities at layers of same protocol stacks according to a same bearer configuration parameter, thereby establishing a data radio bearer to the second network node corresponding to the second cell. In addition, the user equipment initiates a random access process to the second network node corresponding to the second cell, and establishes a radio resource control connection to the second network node.

As described above, in step S415, the user equipment may establish all or some data radio bearers to the second network node corresponding to the second cell, where all the data radio bearers include that the bearers are all established in the cell of the second network node, and the some data radio bearers include uplink data radio bearers and/or downlink data radio bearers, or the data radio bearers include some protocol layers (which, for example, include only a data link layer, a Media Access Control layer, and a physical layer).

As can be known from the foregoing, in some feasible implementation manners of the present invention, when user equipment is in an RRC-IDLE mode, the user equipment measures neighboring cells by using a message sent by a first network node, and obtains measurement results; and selects at least one to-be-connected cell from the neighboring cells of a cell of the first network node according to the message sent by the first network node and the measurement results, where the to-be-connected cell is included in the neighboring cells, and a network node corresponding to the to-beconnected cell can establish a connection to the user equipment. In this way, a time at which a to-be-connected cell that can establish a connection to the UE is found is advanced to a time point when the user equipment is in the RRC-IDLE mode, and when initially establishing a data radio bearer, the UE directly establishes the data radio bearer to a second network node corresponding to the to-be-connected cell, thereby eliminating a cell handover procedure. In addition, in this embodiment of the present invention, when the UE is in the RRC-IDLE mode, the UE keeps camping on the cell of the first network node, which can avoid a defect that when a camped device of the UE is handed over from the first network node to another network node when the UE is in the RRC-IDLE mode, the UE cannot receive a paging message from the another network node when the UE is in the RRC-IDLE mode and therefore cannot establish a connection to the another network node.

Figure 5:
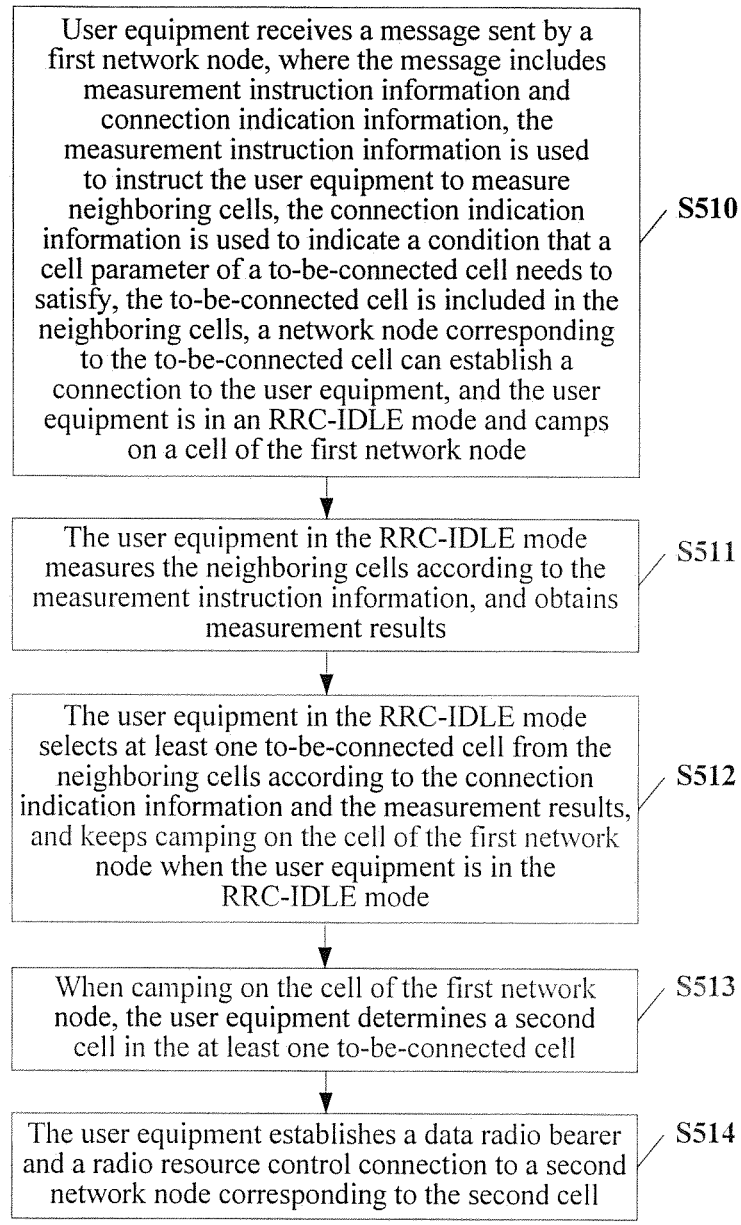
FIG. 5 is a schematic flowchart of another embodiment of a wireless communications method according to the present invention.

FIG. 5 is a schematic flowchart of another embodiment of a wireless communications method according to the present invention. As shown in FIG. 5, the method includes: step S510 to step S512. Step S510 to step S512 are roughly the same as steps S110 to S112 in FIG. 1 respectively, and are not described in detail herein. A main difference between this embodiment and the embodiment shown in FIG. 1 lies in that this embodiment includes:

Step S513: When camping on the cell of the first network node, the user equipment determines a second cell in the at least one to-be-connected cell.

In specific implementation, the user equipment may determine a cell in the at least one to-be-connected cell according to cell information of the at least one to-be-connected cell, for example, may select a cell having the best reference signal received power as the second cell according to at least one of a PCI, frequency information, reference signal received power (Reference Signal Received Power, RSRP), reference signal received quality (Reference Signal Received Quality, RSRQ), CSI-RS configuration information, and DRS configuration information of the at least one to-be-connected cell, or may randomly select a cell as the second cell according to a PCI.

Step S514: The user equipment establishes a data radio bearer and a radio resource control connection to a second network node corresponding to the second cell.

In specific implementation, in step S514, the user equipment and the second network node corresponding to the second cell configure entities at layers of same protocol stacks according to a same bearer configuration parameter, thereby establishing a data radio bearer to the second network node corresponding to the second cell. In addition, the user equipment initiates a random access process to the second network node corresponding to the second cell, and establishes a radio resource control connection to the second network node.

As can be known from the foregoing, in some feasible implementation manners of the present invention, when user equipment is in an RRC-IDLE mode, the user equipment measures neighboring cells by using a message sent by a first network node, and obtains measurement results; and selects at least one to-be-connected cell from the neighboring cells of a cell of the first network node according to the message sent by the first network node and the measurement results, where the to-be-connected cell is included in the neighboring cells, and a network node corresponding to the to-be-connected cell can establish a connection to the user equipment. In this way, a time at which a to-be-connected cell that can establish a connection to the UE is found is advanced to a time point when the user equipment is in the RRC-IDLE mode, and when initially establishing a radio resource control connection and a data radio bearer, the UE directly establishes the radio resource control connection and the data radio bearer to a second network node corresponding to the to-be-connected cell, thereby eliminating a cell handover procedure. In addition, in this embodiment of the present invention, when the UE is in the RRC-IDLE mode, the UE keeps camping on the cell of the first network node, which can avoid a defect that when a camped device of the UE is handed over from the first network node to another network node when the UE is in the RRC-IDLE mode, the UE cannot receive a paging message from the another network node when the UE is in the RRC-IDLE mode and therefore cannot establish a connection to the another network node.

Figure 6:
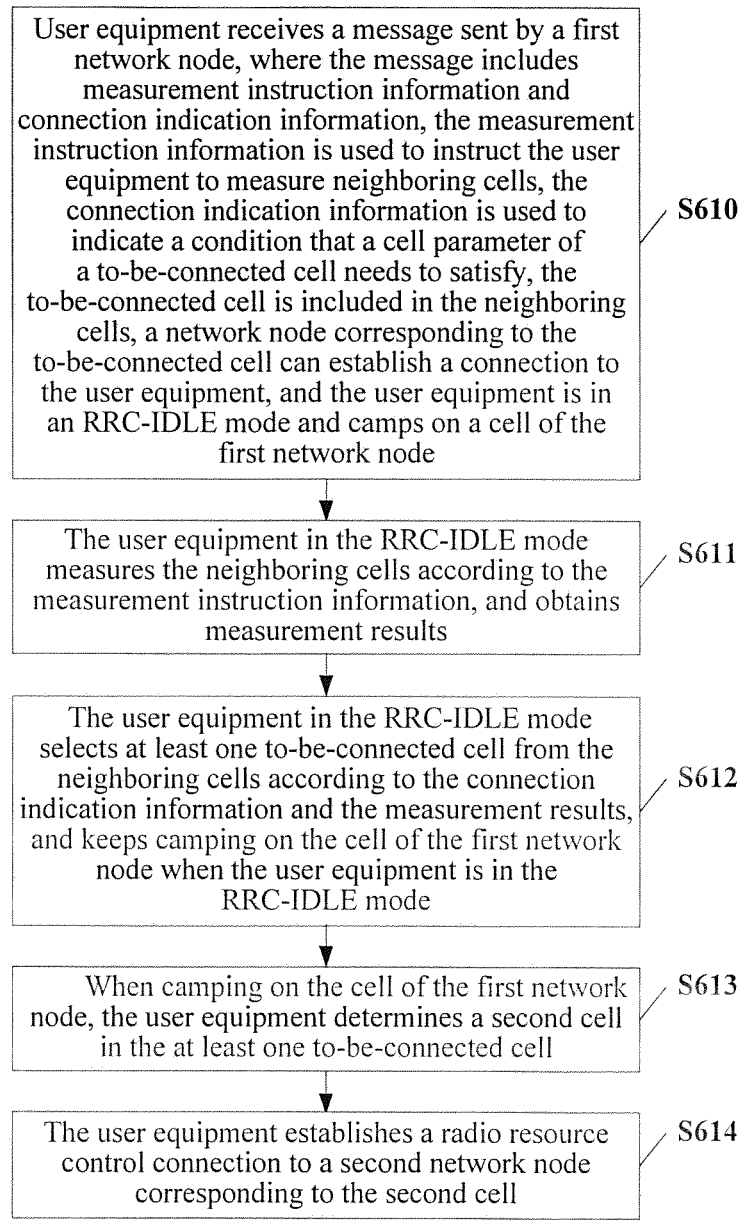
FIG. 6 is a schematic flowchart of another embodiment of a wireless communications method according to the present invention.

FIG. 6 is a schematic flowchart of another embodiment of a wireless communications method according to the present invention. As shown in FIG. 6, the method includes: step S610 to step S613. Step S610 to step S613 are roughly the same as steps S510 to S513 in FIG. 5 respectively, and are not described in detail herein. A main difference between this embodiment and the embodiment shown in FIG. 5 lies in that this embodiment includes:

Step S614: The user equipment establishes a radio resource control connection to the second network node corresponding to the second cell. In specific implementation, in step S614, the user equipment initiates a random access process to the second network node corresponding to the second cell, and establishes a radio resource control connection to the second network node.

Step S615: The user equipment establishes a data radio bearer to the first network node.

In specific implementation, as an optional implementation manner, in step S614, in a process of establishing a radio resource control connection to the second network node corresponding to the second cell, the user equipment sends cell identifier information of the cell of the first network node to the second network node, where a time at which the cell identifier information of the cell of the first network node is sent may be any one of the following times:

a time at which random access code is sent to the second network node;

a time at which a radio resource control connection request message is sent to the second network node;

a time at which a radio resource control connection complete message is sent to the second network node; and a time before which a measurement configuration sent by the second network node is received.

In addition, the user equipment receives the cell identifier information and a bearer configuration parameter that are of the cell of the first network node and that are sent by the second network node.

In this way, in step S615, the user equipment and the first network node can configure entities at layers of same protocol stacks according to the same bearer configuration parameter sent by the second network node, thereby establishing a data radio bearer to the first network node.

As can be known from the foregoing, in some feasible implementation manners of the present invention, when user equipment is in an RRC-IDLE mode, the user equipment measures neighboring cells by using a message sent by a first network node, and obtains measurement results; and selects at least one to-be-connected cell from the neighboring cells of a cell of the first network node according to the message sent by the first network node and the measurement results, where the to-be-connected cell is included in the neighboring cells, and a network node corresponding to the to-be-connected cell can establish a connection to the user equipment. In this way, a time at which a to-be-connected cell that can establish a connection to the UE is found is advanced to a time point when the user equipment is in the RRC-IDLE mode, and when initially establishing a radio resource control connection, the UE directly establishes the radio resource control connection to a second network node corresponding to the to-be-connected cell, thereby eliminating a cell handover procedure. In addition, in this embodiment of the present invention, when the UE is in the RRC-IDLE mode, the UE keeps camping on the cell of the first network node, which can avoid a defect that when a camped device of the UE is handed over from the first network node to another network node when the UE is in the RRC-IDLE mode, the UE cannot receive a paging message from the another network node when the UE is in the RRC-IDLE mode and therefore cannot establish a connection to the another network node.

The embodiments of the wireless communications methods that can be implemented by user equipment are listed above, and an wireless communications method that can be implemented by a network node on a network side is further described below by using examples.

Figure 7:
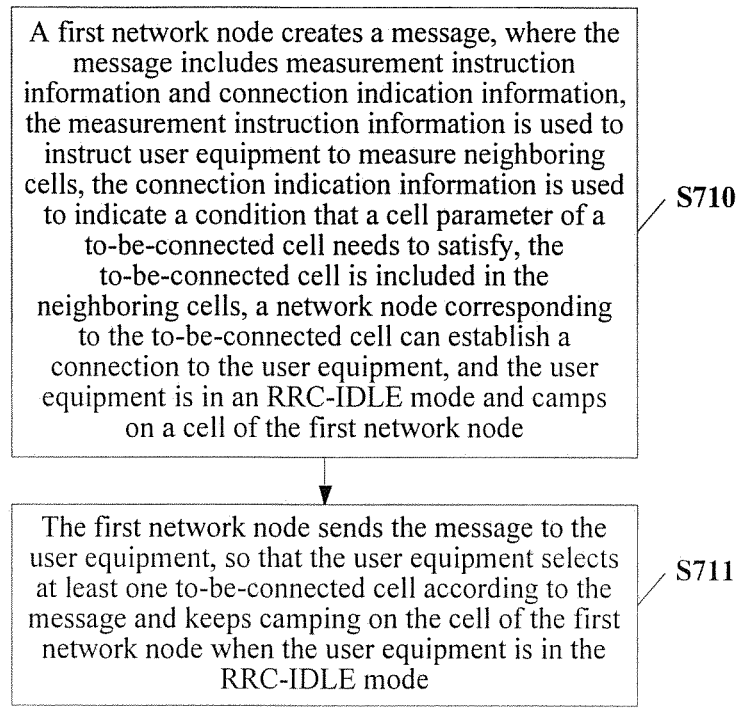
FIG. 7 is a schematic flowchart of another embodiment of a wireless communications method according to the present invention.

FIG. 7 is a schematic flowchart of another embodiment of a wireless communications method according to the present invention. As shown in FIG. 7, the method may include:

Step S710: A first network node creates a message, where the message includes measurement instruction information and connection indication information, the measurement instruction information is used to instruct user equipment to measure neighboring cells, the connection indication information is used to indicate a condition that a cell parameter of a to-be-connected cell needs to satisfy, the to-be-connected cell is included in the neighboring cells, a network node corresponding to the to-be-connected cell can establish a connection to the user equipment, and the user equipment is in an RRC-IDLE mode and camps on a cell of the first network node. The cell parameter includes at least one of strength of a reference signal, quality of a reference signal, and a signal to interference plus noise ratio of a cell discovery signal.

In specific implementation, in step S710, the created message may be a system broadcast message or another message that can carry the measurement instruction information and the connection indication information.

In specific implementation, related content of the measurement instruction information and the connection indication information in the created message is the same as that described in step S110, and is not described in detail herein.

In specific implementation, a device that may be included as the first network node and a device that may be included as the network node corresponding to the to-be-connected cell are the same as those described in step S110, and are not described in detail herein.

Step S711: The first network node sends the message to the user equipment, so that the user equipment selects at least one to-be-connected cell according to the message and keeps camping on the cell of the first network node when the user equipment is in the RRC-IDLE mode (for specific implementation details about the selection of the at least one to-be-connected cell according to the message by the user equipment, reference may be made to related steps in FIG. 1 to FIG. 6).

As can be seen from the foregoing, in some feasible implementation manners of the present invention, when user equipment is in an RRC-IDLE mode and camps on a first network node, the first network node creates a message, and sends the created message to the user equipment, where the measurement instruction information is used to instruct the user equipment to measure neighboring cells, the connection indication information is used to indicate a condition that a cell parameter of a to-be-connected cell needs to satisfy, the to-be-connected cell is included in the neighboring cells, and a network node corresponding to the to-be-connected cell (to facilitate differentiation from the first network node, the network node is referred to as a "second network node" below) can establish a connection to the user equipment, so that the user equipment selects at least one to-be-connected cell according to the message. In this way, a time at which a to-be-connected cell that can establish a connection to the UE is found is advanced to a time point when the user equipment is in the RRC-IDLE mode, which helps the UE to subsequently directly establish a connection to a network node corresponding to the to-be-connected cell, and a cell handover procedure can be eliminated.

Figure 8:
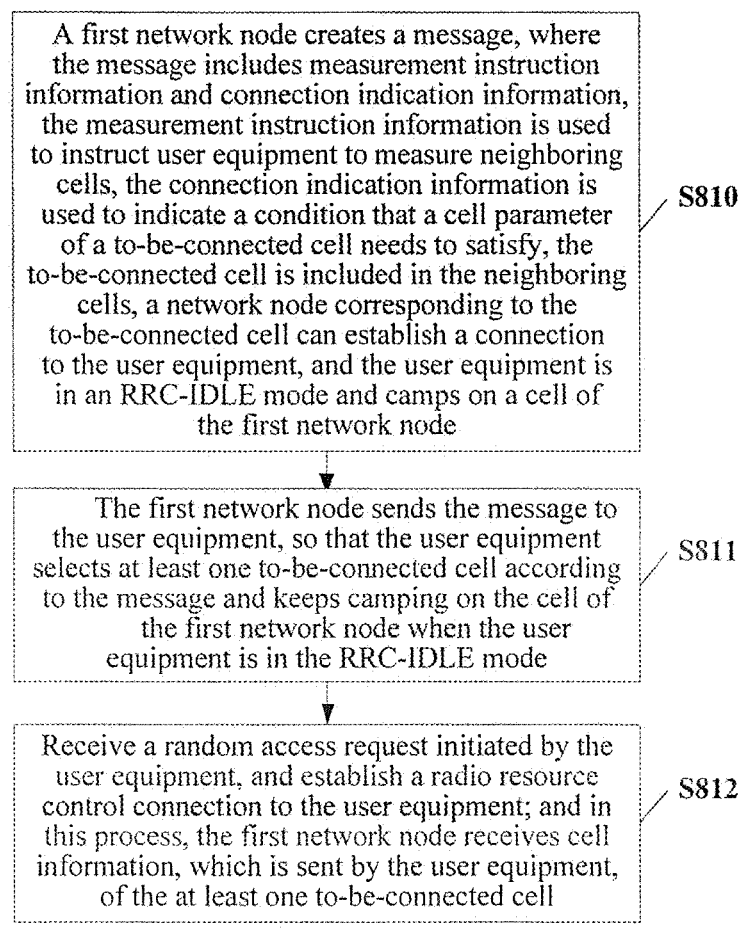
FIG. 8 is a schematic flowchart of another embodiment of a wireless communications method according to the present invention.

FIG. 8 is a schematic flowchart of another embodiment of a wireless communications method according to the present invention. As shown in FIG. 8, the method includes: step S810 to step S811. Step S810 to step S811 are roughly the same as steps S710 to S711 in FIG. 7 respectively, and are not described in detail herein. A main difference between this embodiment and the embodiment shown in FIG. 7 lies in that this embodiment includes:

Step S812: Receive a random access request initiated by the user equipment, and establish a radio resource control connection to the user equipment; and in this process, the first network node receives cell information, which is sent by the user equipment, of the at least one to-be-connected cell, where a time at which the cell information of the to-be-connected cell is received may be any one of the following times:

a time at which random access code sent by the user equipment is received;

a time at which a radio resource control connection request message sent by the user equipment is received;

a time at which a radio resource control connection complete message sent by the user equipment is received; and a time before which a measurement configuration is sent to the user equipment.

Based on the embodiment shown in FIG. 7, this embodiment provides an implementation solution for how and when the first network node receives, from the user equipment, the cell information of the at least one to-be-connected cell selected by the user equipment.

Figure 9:
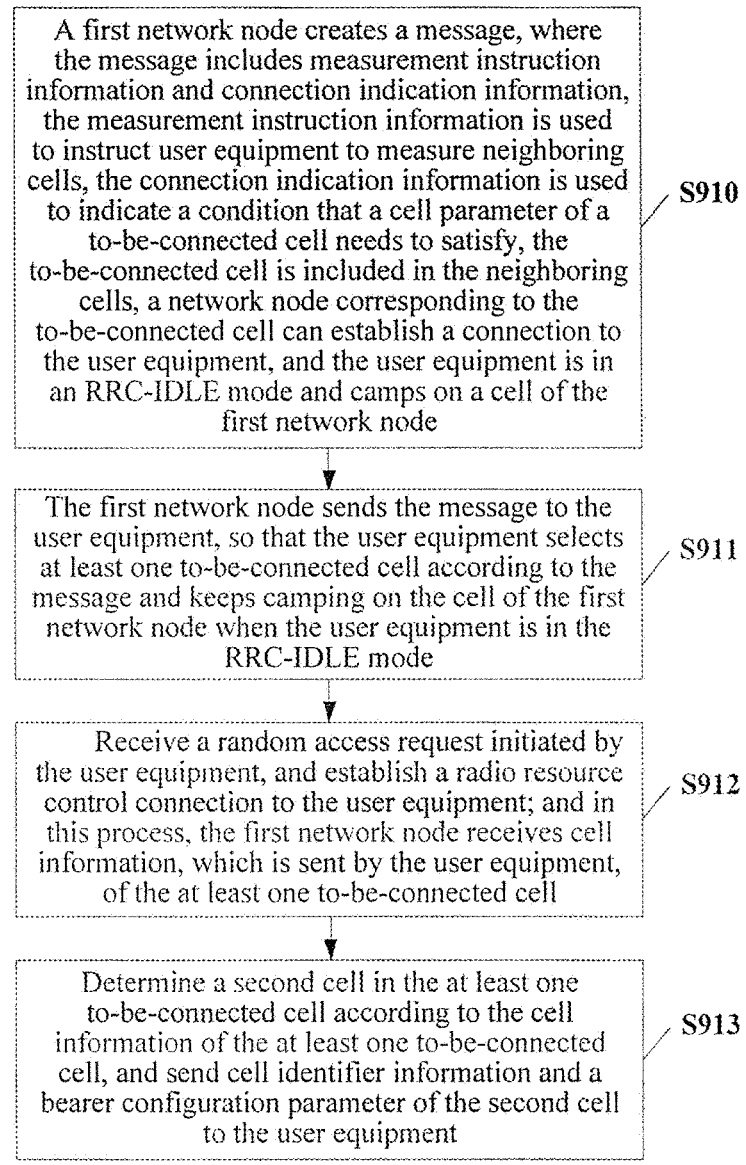
FIG. 9 is a schematic flowchart of another embodiment of a wireless communications method according to the present invention.

FIG. 9 is a schematic flowchart of another embodiment of a wireless communications method according to the present invention. As shown in FIG. 9, the method includes: step S910 to step S912. Step S910 to step S912 are roughly the same as steps S810 to S812 in FIG. 8 respectively, and are not described in detail herein. A main difference between this embodiment and the embodiment shown in FIG. 8 lies in that this embodiment includes:

Step S913: Determine a second cell from the at least one to-be-connected cell according to the cell information of the at least one to-be-connected cell, and send cell identifier information and a bearer configuration parameter of the second cell to the user equipment, so that the user equipment establishes, according to the cell identifier information and the bearer configuration parameter of the second cell, a data radio bearer to a second network node corresponding to the second cell.

The first network node may determine a cell in the at least one to-be-connected cell according to the cell information of the at least one to-be-connected cell, for example, may select a cell having the best reference signal received power as the second cell according to at least one of a PCI, frequency information, reference signal received power (Reference Signal Received Power, RSRP), reference signal received quality (Reference Signal Received Quality, RSRQ), CSI-RS configuration information, and DRS configuration information of the at least one to-be-connected cell, or may randomly select a cell as the second cell according to a PCI.

In specific implementation, specific content included in the bearer configuration parameter is the same as that described in step S314, and is not described in detail herein.

As can be seen from the foregoing, in some feasible implementation manners of the present invention, when user equipment is in an RRC-IDLE mode and camps on a first network node, the first network node creates a message, and sends the created message to the user equipment, where the measurement instruction information is used to instruct the user equipment to measure neighboring cells, the connection indication information is used to indicate a condition that a cell parameter of a to-be-connected cell needs to satisfy, the to-be-connected cell is included in the neighboring cells, and a network node corresponding to the to-be-connected cell can establish a connection to the user equipment; and selects, for the user equipment, at least one second cell that can establish a connection to the user equipment. In this way, a time at which a to-be-connected cell that can establish a connection to the UE is found is advanced to a time point when the user equipment is in the RRC-IDLE mode, which helps the UE to subsequently directly establish a connection to a network node corresponding to the to-be-connected cell, and a cell handover procedure can be eliminated.

Figure 10:
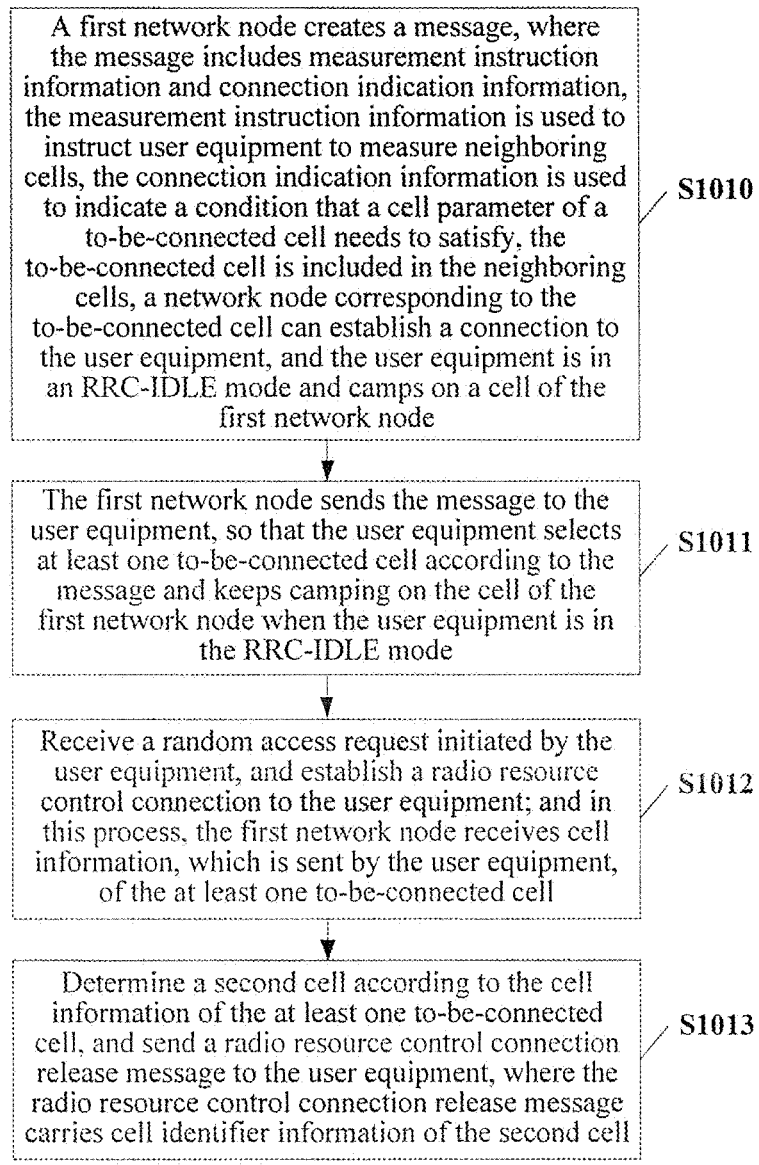
FIG. 10 is a schematic flowchart of another embodiment of a wireless communications method according to the present invention.

FIG. 10 is a schematic flowchart of another embodiment of a wireless communications method according to the present invention. As shown in FIG. 10, the method includes: step S1010 to step S1012. Step S1010 to step S1012 are roughly the same as steps S810 to S812 in FIG. 8 respectively, and are not described in detail herein. A main difference between this embodiment and the embodiment shown in FIG. 8 lies in that this embodiment includes:

Step S1013: Determine a second cell according to the cell information of the at least one to-be-connected cell, and send a radio resource control connection release message to the user equipment, where the radio resource control connection release message carries cell identifier information of the second cell, so that the user equipment establishes, according to the cell identifier information of the second cell, a data radio bearer and a radio resource control connection to a second network node corresponding to the second cell.

In specific implementation, after the first network node acquires the cell information of the at least one to-be-connected cell from the user equipment, the first network node may determine a cell in the at least one to-be-connected cell according to the cell information of the at least one to-be-connected cell, for example, may select a cell having the best reference signal received power as the second cell according to at least one of a PCI, frequency information, reference signal received power (Reference Signal Received Power, RSRP), reference signal received quality (Reference Signal Received Quality, RSRQ), CSI-RS configuration information, and DRS configuration information of the at least one to-be-connected cell, or may randomly select a cell as the second cell according to a PCI.

In specific implementation, when sending the radio resource control radio resource control connection release message, the first network node may indicate a release reason, for example, the release reason is that a small cell is found.

As can be seen from the foregoing, in some feasible implementation manners of the present invention, when user equipment is in an RRC-IDLE mode and camps on a first network node, the first network node creates a message, and sends the created message to the user equipment, where the measurement instruction information is used to instruct the user equipment to measure neighboring cells, the connection indication information is used to indicate a condition that a cell parameter of a to-be-connected cell needs to satisfy, the to-be-connected cell is included in the neighboring cells, and a network node corresponding to the to-be-connected cell can establish a connection to the user equipment; and selects, for the user equipment, at least one second cell that can establish a connection to the user equipment. In this way, a time at which a to-be-connected cell that can establish a connection to the UE is found is advanced to a time point when the user equipment is in the RRC-IDLE mode, which helps the UE to subsequently directly establish a connection to a network node corresponding to the to-be-connected cell, and a cell handover procedure can be eliminated.

Correspondingly, the embodiments of the present invention further provide embodiments of user equipment and a network node that can implement the foregoing method embodiments, and the device embodiments are described below by using examples.

Figure 11:
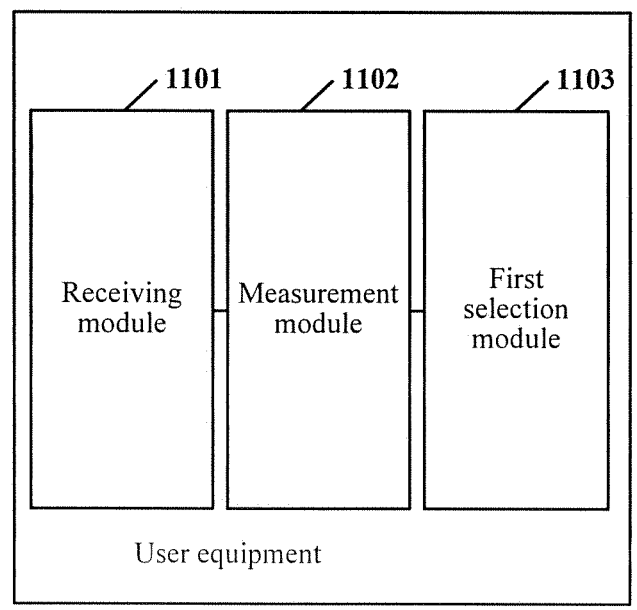
FIG. 11 is a schematic structural composition diagram of an embodiment of user equipment according to the present invention.

FIG. 11 is a schematic structural composition diagram of an embodiment of user equipment according to the present invention. As shown in FIG. 11, the user equipment may include: a receiving module 1101, a measurement module 1102, and a first selection module 1103.

The receiving module 1101 is configured to: when the user equipment is in an RRC-IDLE mode and camps on a cell of a first network node, receive a message sent by the first network node, where the message includes measurement instruction information and connection indication information, the measurement instruction information is used to instruct the user equipment to measure neighboring cells, the connection indication information is used to indicate a condition that a cell parameter of a to-be-connected cell needs to satisfy, the to-be-connected cell is included in the neighboring cells, and a network node corresponding to the to-be-connected cell can establish a connection to the user equipment. The cell parameter includes at least one of strength of a reference signal, quality of a reference signal, and a signal to interference plus noise ratio of a cell discovery signal.

In specific implementation, the message sent by the first network node and received by the receiving module 1101 may be a system broadcast message or another message that can carry the measurement instruction information and the connection indication information.

In specific implementation, related content of the measurement instruction information and the connection indication information that are included in the message received by the receiving module 1101 is the same as that described in step S110 in the method embodiment, and is not described in detail herein.

In specific implementation, a device that may be included as the first network node and a device that may be included as the network node corresponding to the to-be-connected cell are the same as those described in step S110 in the method embodiment, and are not described in detail herein.

The measurement module 1102 is configured to: when the user equipment is in the RRC-IDLE mode, measure the neighboring cells according to the measurement instruction information received by the receiving module 1101, and obtain measurement results.

With reference to the foregoing description, when the measurement instruction information includes physical cell identifiers and/or frequencies of the neighboring cells (where explicit indication is used herein as an example for description, and in specific implementation, the following description is also applicable to a case in which the measurement instruction information indicates the cell identifiers and/or the frequencies in an implicit manner), the measurement module 1102 is specifically configured to: when the user equipment is in the RRC-IDLE mode, measure reference signals of cells corresponding to the physical cell identifiers and/or the frequencies, and obtain strength and/or quality of the reference signals; or when the user equipment is in the RRC-IDLE mode, measure discovery signals of cells corresponding to the physical cell identifiers and/or the frequencies, and obtain signal to interference plus noise ratios of the discovery signals. As described above, the measured reference signals herein may be at least one of channel state information reference signals or cell-specific reference signals; and the measured discovery signals herein may be at least one of primary synchronization signals and secondary synchronization signals or other signals used for cell discovery.

Further, when the measurement instruction information includes configuration information of reference signals that need to be measured and/configuration information of discovery signals that need to be measured (where explicit indication is used herein as an example for description, and in specific implementation, the following description is also applicable to a case in which the measurement instruction information indicates the configuration information of the reference signals that need to be measured and/the configuration information of the discovery signals that need to be measured in an implicit manner), during measurement of the neighboring cells, the measurement module 1102 measures the reference signals corresponding to the configuration information of the reference signals indicated by the measurement instruction information, and/or measures the discovery signals corresponding to the configuration information of the discovery signals indicated by the measurement instruction information.

The first selection module 1103 is configured to select at least one to-be-connected cell from the neighboring cells according to the connection indication information received by the receiving module 1101 and the measurement results obtained by the measurement module 1102, and keep the user equipment camping on the cell of the first network node when the user equipment is in the RRC-IDLE mode.

With reference to the foregoing description, when the connection indication information received by the receiving module 1101 includes a cell reselection criterion (where explicit indication is used herein as an example for description, and in specific implementation, the following description is also applicable to a case in which the connection indication information indicates the cell reselection criterion in an implicit manner), the first selection module 1103 is specifically configured to select, from the neighboring cells, a to-be-connected cell whose reference signal has strength and/or quality that satisfies the cell reselection criterion, or select, from the neighboring cells, a to-be-connected cell whose discovery signal has a signal to interference plus noise ratio that satisfies the cell reselection criterion.

When the connection indication information includes at least one of the following information (where explicit indication is used herein as an example for description, and in specific implementation, the following description is also applicable to a case in which the connection indication information indicates the following information in an implicit manner): a minimum strength threshold of a reference signal that a to-be-connected cell needs to satisfy, a minimum quality threshold of a reference signal that a to-be-connected cell needs to satisfy, a minimum signal to interference plus noise ratio threshold of a discovery signal that a to-be-connected cell needs to satisfy, and a maximum quantity N of to-be-connected cells allowed to be selected, the first selection module 1103 is specifically configured to select, from the neighboring cells, at least one to-be-connected cell that satisfies at least one condition of the following conditions, where the conditions include:

strength of a reference signal is greater than or equal to the minimum strength threshold of a reference signal;

quality of a reference signal is greater than or equal to the minimum quality threshold of a reference signal;

a signal to interference plus noise ratio of a discovery signal is greater than or equal to the minimum signal to interference plus noise ratio threshold of a discovery signal;

being included in N measured neighboring cells whose reference signals have greatest strength;

being included in N measured neighboring cells whose reference signals have best quality; and being included in N neighboring cells whose discovery signals have greatest signal to interference plus noise ratios.

In specific implementation, the user equipment may save cell information of a to-be-connected cell selected from the neighboring cells. The cell information may include at least one of a PCI, frequency information, reference signal received power (Reference Signal Received Power, RSRP), reference signal received quality (Reference Signal Received Quality, RSRQ), CSI-RS configuration information, and DRS configuration information.

As can be known from the foregoing, in some feasible implementation manners of the present invention, when user equipment is in an RRC-IDLE mode, the user equipment measures neighboring cells by using a message sent by a first network node, and obtains measurement results; and selects at least one to-be-connected cell from the neighboring cells of a cell of the first network node according to the message sent by the first network node and the measurement results, where the to-be-connected cell is included in the neighboring cells, and a network node corresponding to the to-be-connected cell can establish a connection to the user equipment. In this way, a time at which a to-be-connected cell that can establish a connection to the UE is found is advanced to a time point when the user equipment is in the RRC-IDLE mode, which helps the UE to subsequently directly establish a connection to a network node corresponding to the to-be-connected cell, and a cell handover procedure can be eliminated. In addition, in this embodiment of the present invention, when the UE is in the RRC-IDLE mode, the UE keeps camping on the cell of the first network node, which can avoid a defect that when a camped device of the UE is handed over from the first network node to another network node when the UE is in the RRC-IDLE mode, the UE cannot receive a paging message from the another network node when the UE is in the RRC-IDLE mode and therefore cannot establish a connection to the another network node.

Figure 12:
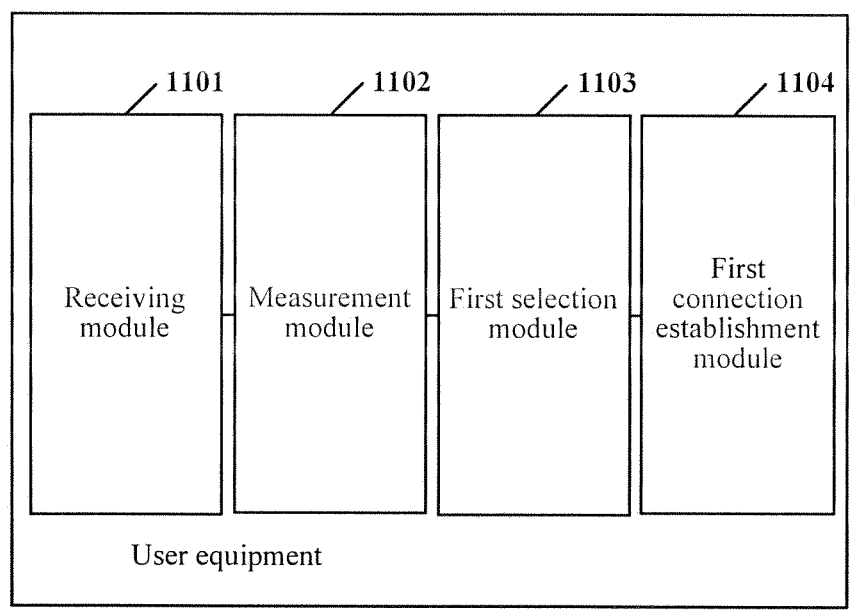
FIG. 12 is a schematic structural composition diagram of another embodiment of user equipment according to the present invention.

Further, FIG. 12 shows another embodiment of user equipment according to the present invention, and a main difference between this embodiment and the embodiment shown in FIG. 11 lies in that this embodiment includes:

a first connection establishment module 1104, configured to initiate random access to the first network node, establish a radio resource control connection to the first network node, and send cell information of the at least one to-be-connected cell selected by the first selection module 1103 to the first network node, where a time at which the cell information of the to-be-connected cell is sent may be any one of the following times:

a time at which random access code is sent to the first network node;

a time at which a radio resource control connection request message is sent to the first network node;

a time at which a radio resource control connection complete message is sent to the first network node; and a time before which a measurement configuration sent by the first network node is received.

In another embodiment of the user equipment, the receiving module 1101 may be further configured to receive cell identifier information and a bearer configuration parameter that are of a second cell and that are sent by the first network node, where the second cell is a cell determined in the at least one to-be-connected cell by the first network node according to the cell information of the at least one to-be-connected cell; and the first connection establishment module 1104 may be further configured to establish, according to the cell identifier information and the bearer configuration parameter that are of the second cell and that are received by the receiving module, a data radio bearer to a second network node corresponding to the second cell. In specific implementation, the first connection establishment module 1104 and the second network node corresponding to the second cell indicated by the identifier information of the second cell configure entities at layers of same protocol stacks according to an indication of the bearer configuration parameter, so that the user equipment establishes a data radio bearer to the second network node corresponding to the second cell.

In specific implementation, the first connection establishment module 1104 may establish all or some data radio bearers to the second network node corresponding to the second cell, where all the data radio bearers include that the bearers are all established in the cell of the second network node, and the some data radio bearers include uplink data radio bearers and/or downlink data radio bearers, or the data radio bearers include some protocol layers (which, for example, include only a data link layer, a Media Access Control layer, and a physical layer).

In another embodiment of the user equipment, the receiving module 1101 may be further configured to receive a radio resource control connection release message from the first network node, where the radio resource control connection release message carries cell identifier information of a second cell, where the second cell is a cell determined in the at least one to-be-connected cell by the first network node according to the cell information of the at least one to-be-connected cell; and the first connection establishment module 1104 may be further configured to establish, according to the cell identifier information of the second cell that is received by the receiving module 1101, a data radio bearer and a radio resource control connection to a second network node corresponding to the second cell. In specific implementation, the first connection establishment module 1104 and the second network node corresponding to the second cell may configure entities at layers of same protocol stacks according to a same bearer configuration parameter, so that the user equipment establishes a data radio bearer to the second network node corresponding to the second cell. In addition, the first connection establishment module 1104 initiates a random access process to the second network node corresponding to the second cell, so that the user equipment establishes a radio resource control connection to the second network node.

Figure 13:
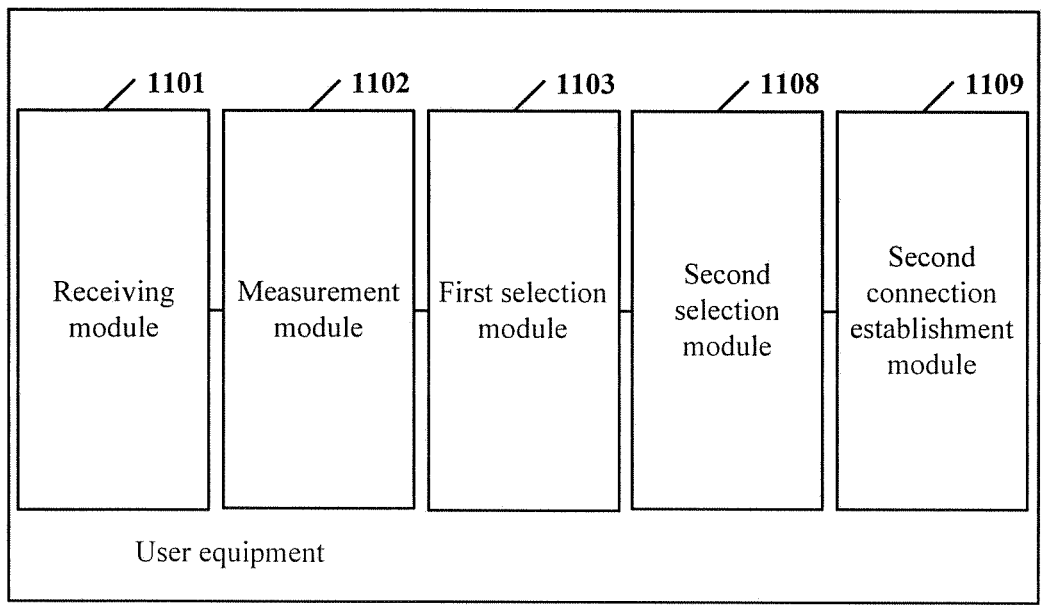
FIG. 13 is a schematic structural composition diagram of another embodiment of user equipment according to the present invention.

Further, FIG. 13 shows another embodiment of user equipment according to the present invention, and a main difference between this embodiment and the embodiment shown in FIG. 11 lies in that this embodiment includes: a second selection module 1108 and a second connection establishment module 1109.

The second selection module 1108 is configured to: when the user equipment camps on the cell of the first network node, determine a second cell from the at least one to-be-connected cell according to cell information of the at least one to-be-connected cell selected by the first selection module 1103.

In specific implementation, the second selection module 1108 may determine a cell in the at least one to-be-connected cell according to cell information of the at least one to-be-connected cell, for example, may select a cell having the best reference signal received power as the second cell according to at least one of a PCI, frequency information, reference signal received power (Reference Signal Received Power, RSRP), reference signal received quality (Reference Signal Received Quality, RSRQ), CSI-RS configuration information, and DRS configuration information of the at least one to-be-connected cell, or may randomly select a cell as the second cell according to a PCI.

The second connection establishment module 1109 is configured to establish a data radio bearer and a radio resource control connection to a second network node corresponding to the second cell determined by the second selection module 1108.

In specific implementation, the second connection establishment module 1109 and the second network node corresponding to the second cell may configure entities at layers of same protocol stacks according to a same bearer configuration parameter, so that the user equipment establishes a data radio bearer to the second network node corresponding to the second cell. In addition, the second connection establishment module 1109 initiates a random access process to the second network node corresponding to the second cell, so that the user equipment establishes a radio resource control connection to the second network node.

As can be known from the foregoing, in some feasible implementation manners of the present invention, when user equipment is in an RRC-IDLE mode, the user equipment measures neighboring cells by using a message sent by a first network node, and obtains measurement results; and selects at least one to-be-connected cell from the neighboring cells of a cell of the first network node according to the message sent by the first network node and the measurement results, where the to-be-connected cell is included in the neighboring cells, and a network node corresponding to the to-be-connected cell can establish a connection to the user equipment. In this way, a time at which a to-be-connected cell that can establish a connection to the UE is found is advanced to a time point when the user equipment is in the RRC-IDLE mode, and when initially establishing a radio resource control connection and a data radio bearer, the UE directly establishes the radio resource control connection and the data radio bearer to a second network node corresponding to the to-be-connected cell, thereby eliminating a cell handover procedure. In addition, in this embodiment of the present invention, when the UE is in the RRC-IDLE mode, the UE keeps camping on the cell of the first network node, which can avoid a defect that when a camped device of the UE is handed over from the first network node to another network node when the UE is in the RRC-IDLE mode, the UE cannot receive a paging message from the another network node when the UE is in the RRC-IDLE mode and therefore cannot establish a connection to the another network node.

Figure 14:
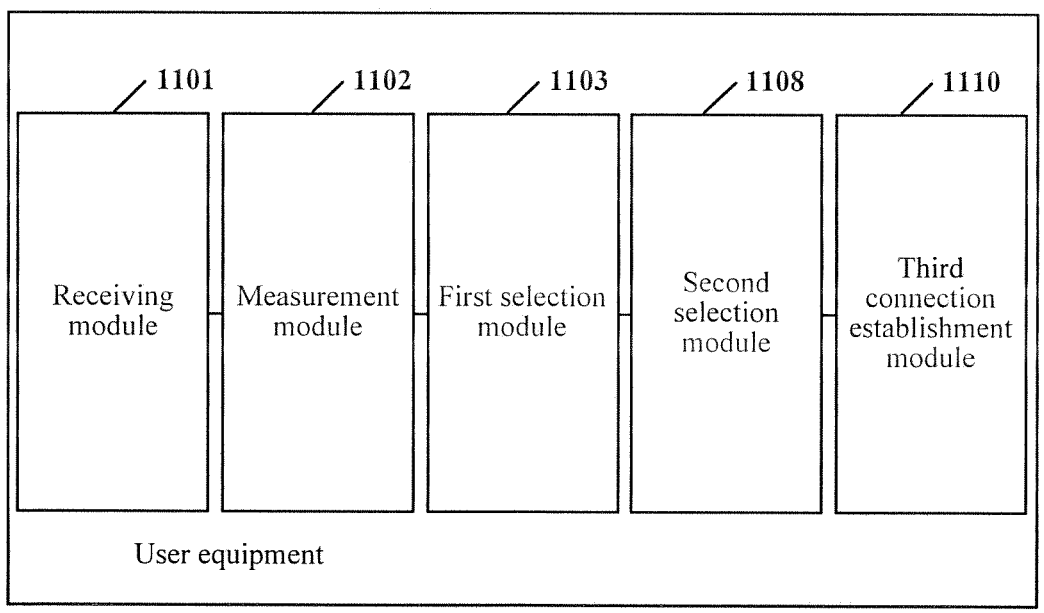
FIG. 14 is a schematic structural composition diagram of another embodiment of user equipment according to the present invention.

Further, FIG. 14 shows another embodiment of user equipment according to the present invention, and a main difference between this embodiment and the embodiment shown in FIG. 13 lies in that this embodiment includes:

a third connection establishment module 1110, configured to establish a radio resource control connection to the second network node corresponding to the second cell determined by the second selection module 1108, and establish a data radio bearer to the first network node.

In specific implementation, the third connection establishment module 1110 and the first network node may configure entities at layers of same protocol stacks according to a same bearer configuration parameter, so that the user equipment establishes a data radio bearer to the first network node. In addition, the third connection establishment module 1110 initiates a random access process to the second network node corresponding to the second cell, so that the user equipment establishes a radio resource control connection to the second network node.

As can be known from the foregoing, in some feasible implementation manners of the present invention, when user equipment is in an RRC-IDLE mode, the user equipment measures neighboring cells by using a message sent by a first network node, and obtains measurement results; and selects at least one to-be-connected cell from the neighboring cells of a cell of the first network node according to the message sent by the first network node and the measurement results, where the to-be-connected cell is included in the neighboring cells, and a network node corresponding to the to-be-connected cell can establish a connection to the user equipment. In this way, a time at which a to-be-connected cell that can establish a connection to the UE is found is advanced to a time point when the user equipment is in the RRC-IDLE mode, and when initially establishing a radio resource control connection, the UE directly establishes the radio resource control connection to a second network node corresponding to the to-be-connected cell, thereby eliminating a cell handover procedure. In addition, in this embodiment of the present invention, when the UE is in the RRC-IDLE mode, the UE keeps camping on the cell of the first network node, which can avoid a defect that when a camped device of the UE is handed over from the first network node to another network node when the UE is in the RRC-IDLE mode, the UE cannot receive a paging message from the another network node when the UE is in the RRC-IDLE mode and therefore cannot establish a connection to the another network node.

Figure 15:
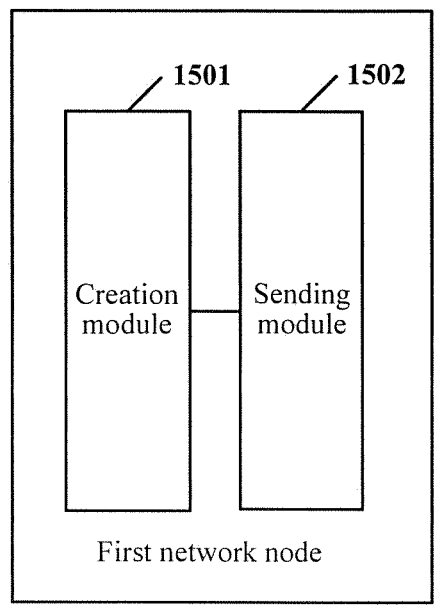
FIG. 15 is a schematic structural composition diagram of an embodiment of a first network node according to the present invention.

FIG. 15 is a schematic structural composition diagram of an embodiment of a first network node according to the present invention. As shown in FIG. 15, the first network node may include: a creation module 1501 and a sending module 1502.

The creation module 1501 is configured to create a message, where the message includes measurement instruction information and connection indication information, the measurement instruction information is used to instruct user equipment to measure neighboring cells, the connection indication information is used to indicate a condition that a cell parameter of a to-be-connected cell needs to satisfy, the to-be-connected cell is included in the neighboring cells, a network node corresponding to the to-be-connected cell can establish a connection to the user equipment, and the user equipment is in an RRC-IDLE mode and camps on a cell of the first network node. The cell parameter includes at least one of strength of a reference signal, quality of a reference signal, and a signal to interference plus noise ratio of a cell discovery signal.

In specific implementation, related content of the measurement instruction information and the connection indication information that are included in the message created by the creation module 1501 is the same as that described in step S110 in the method embodiment, and is not described in detail herein.

In specific implementation, a device that may be included as the first network node and a device that may be included as the network node corresponding to the to-be-connected cell are the same as those described in step S110 in the method embodiment, and are not described in detail herein.

The sending module 1502 is configured to send, to the user equipment, the message created by the creation module 1501, so that the user equipment selects at least one to-be-connected cell according to the message and keeps camping on the cell of the first network node when the user equipment is in the RRC-IDLE mode (for specific implementation details about the selection of the at least one to-be-connected cell according to the message by the user equipment, reference may be made to related steps in FIG. 1 to FIG. 6).

As can be seen from the foregoing, in some feasible implementation manners of the present invention, when user equipment is in an RRC-IDLE mode and camps on a first network node, the first network node creates a message, and sends the created message to the user equipment, where the measurement instruction information is used to instruct the user equipment to measure neighboring cells, the connection indication information is used to indicate a condition that a cell parameter of a to-be-connected cell needs to satisfy, the to-be-connected cell is included in the neighboring cells, and a network node corresponding to the to-be-connected cell (to facilitate differentiation from the first network node, the network node is referred to as a "second network node" below) can establish a connection to the user equipment, so that the user equipment selects at least one to-be-connected cell according to the message. In this way, a time at which a to-be-connected cell that can establish a connection to the UE is found is advanced to a time point when the user equipment is in the RRC-IDLE mode, which helps the UE to subsequently directly establish a connection to a network node corresponding to the to-be-connected cell, and a cell handover procedure can be eliminated.

Figure 16:
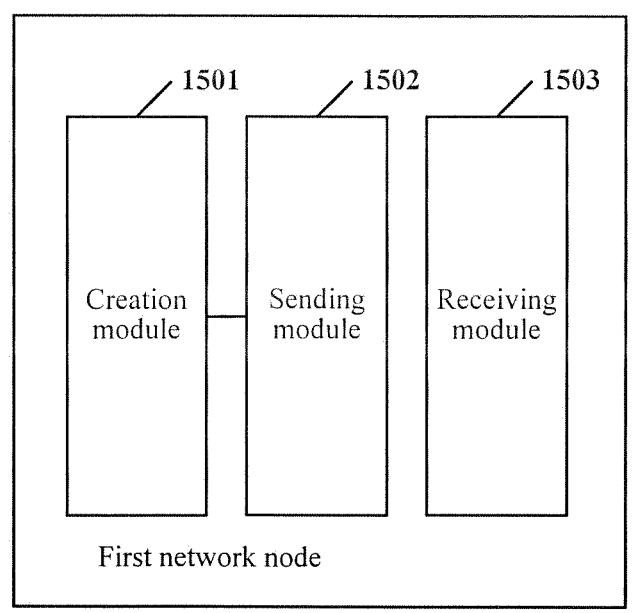
FIG. 16 is a schematic structural composition diagram of another embodiment of a first network node according to the present invention.

Further, FIG. 16 shows another embodiment of a first network node according to the present invention, and a main difference between this embodiment and the embodiment shown in FIG. 15 lies in that this embodiment includes:

a receiving module 1503, configured to receive a random access request initiated by the user equipment, and establish a radio resource control connection to the user equipment; and receive cell information, which is sent by the user equipment, of the at least one to-be-connected cell from the user equipment, where a time at which the receiving module receives the cell information of the to-be-connected cell may be any one of the following times:

a time at which random access code sent by the user equipment is received;

a time at which a radio resource control connection request message sent by the user equipment is received;

a time at which a radio resource control connection complete message sent by the user equipment is received; and a time before which a measurement configuration is sent to the user equipment.

Figure 17:
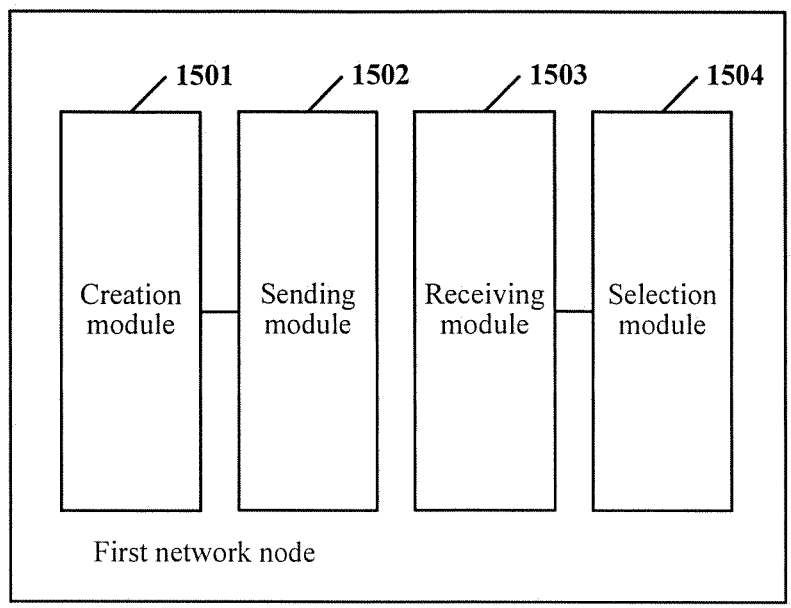
FIG. 17 is a schematic structural composition diagram of another embodiment of a first network node according to the present invention.

Further, FIG. 17 shows another embodiment of a first network node according to the present invention, and a main difference between this embodiment and the embodiment shown in FIG. 16 lies in that this embodiment includes:

a selection module 1504, configured to determine a second cell from the at least one to-be-connected cell according to the cell information, which is received by the receiving module 1503, of the at least one to-be-connected cell, where the sending module 1502 is further configured to send cell identifier information and a bearer configuration parameter of the second cell determined by the selection module 1504 to the user equipment, so that the user equipment establishes, according to the cell identifier information and the bearer configuration parameter of the second cell, a data radio bearer to a second network node corresponding to the second cell.

In specific implementation, the selection module 1504 may determine a cell in the at least one to-be-connected cell according to cell information of the at least one to-be-connected cell, for example, may select a cell having the best reference signal received power as the second cell according to at least one of a PCI, frequency information, reference signal received power (Reference Signal Received Power, RSRP), reference signal received quality (Reference Signal Received Quality, RSRQ), CSI-RS configuration information, and DRS configuration information of the at least one to-be-connected cell, or may randomly select a cell as the second cell according to a PCI.

In specific implementation, specific content included in the bearer configuration parameter is the same as that described in step S314 in the method embodiment, and is not described in detail herein.

As can be seen from the foregoing, in some feasible implementation manners of the present invention, when user equipment is in an RRC-IDLE mode and camps on a first network node, the first network node creates a message, and sends the created message to the user equipment, where the measurement instruction information is used to instruct the user equipment to measure neighboring cells, the connection indication information is used to indicate a condition that a cell parameter of a to-be-connected cell needs to satisfy, the to-be-connected cell is included in the neighboring cells, and a network node corresponding to the to-be-connected cell can establish a connection to the user equipment; and selects, for the user equipment, at least one second cell that can establish a connection to the user equipment. In this way, a time at which a to-be-connected cell that can establish a connection to the UE is found is advanced to a time point when the user equipment is in the RRC-IDLE mode, which helps the UE to subsequently directly establish a connection to a network node corresponding to the to-be-connected cell, and a cell handover procedure can be eliminated.

Another embodiment of a first network node of the present invention includes: a creation module 1501, a sending module 1502, a receiving module 1503, and a selection module 1504. A difference between the sending module 1502 and that in the embodiment shown in FIG. 17 lies in that: in addition to being configured to send the message created by the creation module 1501 to the user equipment, so that the user equipment selects at least one to-be-connected cell according to the message and keeps camping on the cell of the first network node when the user equipment is in an RRC-IDLE mode, the sending module 1502 is further configured to send a radio resource control connection release message to the user equipment, where the radio resource control connection release message carries cell identifier information of the second cell, so that the user equipment establishes, according to the cell identifier information of the second cell, a data radio bearer and a radio resource control connection to a second network node corresponding to the second cell.

In specific implementation, the method embodiments of the embodiments of the present invention may also be implemented by using user equipment or a network node that includes hardware modules of a processor and receiving and sending apparatuses. Implementation of the method embodiments by these hardware structures of the user equipment or the network node that includes the hardware modules is described below by using examples.

Figure 18:
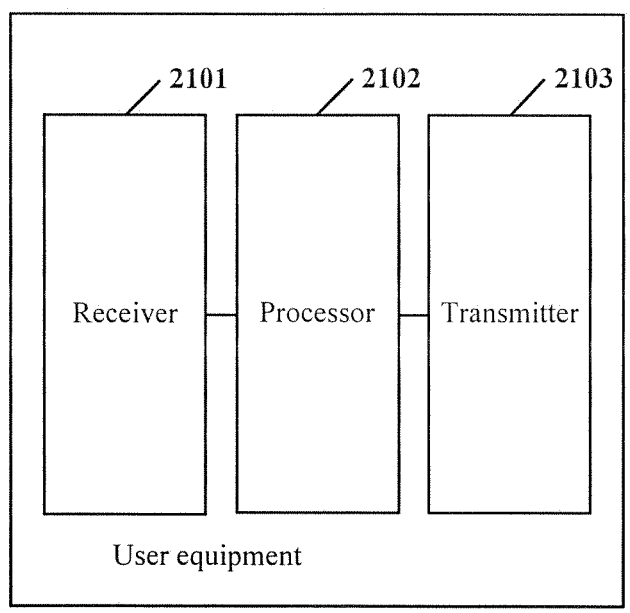
FIG. 18 is a schematic structural composition diagram of another embodiment of user equipment according to the present invention.

FIG. 18 is a schematic structural composition diagram of another embodiment of user equipment according to the present invention. As shown in FIG. 18, the user equipment may include at least a receiver 2101 and a processor 2102, where the receiver 2101 is configured to receive a message sent by the first network node, where the message includes measurement instruction information and connection indication information, the measurement instruction information is used to instruct the user equipment to measure neighboring cells, the connection indication information is used to indicate a condition that a cell parameter of a to-be-connected cell needs to satisfy, the to-be-connected cell is included in the neighboring cells, and a network node corresponding to the to-be-connected cell can establish a connection to the user equipment; and the processor 2102 is configured to: when the user equipment is in an RRC-IDLE mode, measure the neighboring cells according to the measurement instruction information received by the receiver 2101, and obtain measurement results; and select at least one to-be-connected cell from the neighboring cells according to the connection indication information received by the receiver 2101 and the measurement results obtained by the processor 2102, and keep the user equipment camping on the cell of the first network node when the user equipment is in the RRC-IDLE mode.

In some feasible implementation manners, the user equipment may further include:

a transmitter 2103, configured to: when the user equipment camps on the cell of the first network node, initiate random access to the first network node, so that the user equipment establishes a radio resource control connection to the first network node, and send cell information of the at least one selected to-be-connected cell to the first network node, where a time at which the transmitter 2103 sends the cell information of the to-be-connected cell may be any one of the following times:

a time at which random access code is sent to the first network node;

a time at which a radio resource control connection request message is sent to the first network node;

a time at which a radio resource control connection complete message is sent to the first network node; and a time before which the receiver receives a measurement configuration sent by the first network node.

In some feasible implementation manners, the receiver 2101 is further configured to receive cell identifier information and a bearer configuration parameter that are of a second cell and that are sent by the first network node, where the second cell is a cell determined in the at least one to-be-connected cell by the first network node according to the cell information of the at least one to-be-connected cell; and the processor 2102 is further configured to control, according to the cell identifier information and the bearer configuration parameter of the second cell that are received by the receiver 2101, the user equipment to establish a data radio bearer to a second network node corresponding to the second cell.

In some feasible implementation manners, the receiver 2101 is further configured to receive a radio resource control connection release message from the first network node, where the radio resource control connection release message carries cell identifier information of a second cell, where the second cell is a cell determined in the at least one to-be-connected cell by the first network node according to the cell information of the at least one to-be-connected cell; and the processor 2102 is further configured to control, according to the cell identifier information of the second cell that is received by the receiver 2101, the user equipment to establish a data radio bearer and a radio resource control connection to a second network node corresponding to the second cell.

In some feasible implementation manners, the processor 2102 is further configured to: when the user equipment camps on the cell of the first network node, determine a second cell from the at least one to-be-connected cell, and control the user equipment to establish a data radio bearer and a radio resource control connection to a second network node corresponding to the second cell.

In some feasible implementation manners, the processor 2102 is further configured to: when the user equipment camps on the cell of the first network node, determine a second cell from the at least one to-be-connected cell according to cell information of the at least one to-be-connected cell; and control the user equipment to establish a radio resource control connection to a second network node corresponding to the second cell, and control the user equipment to establish a data radio bearer to the first network node.

In specific implementation, specific content included in the received measurement instruction information and connection indication information is the same as that described in step S110 in the method embodiment, and is not described in detail herein.

In specific implementation, a device that may be included as the first network node and a device that may be included as the network node corresponding to the to-be-connected cell are the same as those described in step S110 in the method embodiment, and are not described in detail herein.

Figure 19:
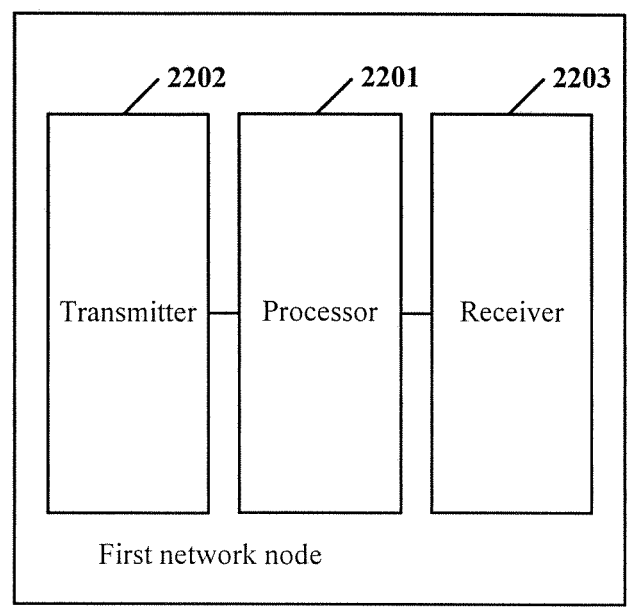
FIG. 19 is a schematic structural composition diagram of another embodiment of a network node according to the present invention.

FIG. 19 is a schematic structural composition diagram of another embodiment of a first network node according to the present invention. As shown in FIG. 19, the first network node in this embodiment at least includes a processor 2201 and a transmitter 2202, where the processor 2201 is configured to create a message, where the message includes measurement instruction information and connection indication information, the measurement instruction information is used to instruct user equipment to measure neighboring cells, the connection indication information is used to indicate a condition that a cell parameter of a to-be-connected cell needs to satisfy, the to-be-connected cell is included in the neighboring cells, a network node corresponding to the to-be-connected cell can establish a connection to the user equipment, and the user equipment is in an RRC-IDLE mode and camps on a cell of the first network node; and the transmitter 2202 is configured to send the message created by the processor 2201 to the user equipment, so that the user equipment selects at least one to-be-connected cell according to the message and keeps camping on the cell of the first network node when the user equipment is in the RRC-IDLE mode.

In some feasible implementation manners, the first network node in this embodiment of the present invention further includes:

a receiver 2203, configured to receive a random access request initiated by the user equipment, so that the first network node establishes a radio resource control connection to the user equipment; and receive cell information, which is sent by the user equipment, of the at least one to-be-connected cell from the user equipment, where a time at which the receiver 2203 receives the cell information of the to-be-connected cell may be any one of the following times:

a time at which random access code sent by the user equipment is received;

a time at which a radio resource control connection request message sent by the user equipment is received;

a time at which a radio resource control connection complete message sent by the user equipment is received; and a time before which the transmitter sends a measurement configuration to the user equipment.

In some feasible implementation manners, the processor 2201 is further configured to determine a second cell from the at least one to-be-connected cell according to the cell information, which is received by the receiver 2203, of the at least one to-be-connected cell; and the transmitter 2202 is further configured to send cell identifier information and a bearer configuration parameter of the second cell determined by the processor 2201 to the user equipment, so that the user equipment establishes, according to the cell identifier information and the bearer configuration parameter of the second cell, a data radio bearer to a second network node corresponding to the second cell.

In some feasible implementation manners, the processor 2201 is further configured to determine a second cell from the at least one to-be-connected cell according to the cell information, which is received by the receiver 2203, of the at least one to-be-connected cell; and the transmitter 2202 is further configured to send a radio resource control connection release message to the user equipment, where the radio resource control connection release message carries cell identifier information of the second cell, so that the user equipment establishes, according to the cell identifier information of the second cell, a data radio bearer and a radio resource control connection to a second network node corresponding to the second cell.

In specific implementation, specific content included in the measurement instruction information and the connection indication information in the created message is the same as that described in step S110 in the method embodiment, and is not described in detail herein.

In specific implementation, a device that may be included as the first network node and a device that may be included as the network node corresponding to the to-be-connected cell are the same as those described in step S110 in the method embodiment, and are not described in detail herein.

In specific implementation, an embodiment of the present invention further provides a computer storage medium, where a program may be stored in the computer storage medium, and when executed, the program may include some or all of the steps of the embodiments of the method provided in the present invention. The storage medium may be a magnetic disk, an optical disc, a read-only memory (Read-Only Memory, ROM), a random access memory (Random Access Memory, RAM), or the like.

Obviously, a person skilled in the art can make various modifications and variations to embodiments of the present invention without departing from the spirit and scope of the present invention. The present invention is intended to cover these modifications and variations provided that these modifications and variations fall within the scope defined by the claims of the present invention and equivalent technologies thereof.

What is claimed is:

1. A wireless communications method, comprising:
   receiving, by user equipment, a message sent by a first network node, wherein the message comprises measurement instruction information and connection indication information, the measurement instruction information is used to instruct the user equipment to measure neighboring cells, the connection indication information is used to indicate a condition that a cell parameter of a to-be-connected cell needs to satisfy, the to-be-connected cell is comprised in the neighboring cells, a network node corresponding to the to-be-connected cell can establish a connection to the user equipment, and the user equipment is in an RRC-IDLE mode and camps on a cell of the first network node;
   measuring, by the user equipment in the RRC-IDLE mode, the neighboring cells according to the measurement instruction information, and obtaining measurement results; and
   selecting, by the user equipment, at least one to-be-connected cell from the neighboring cells according to the connection indication information and the measurement results, and keeping camping on the cell of the first network node when the user equipment is in the RRC-IDLE mode.

2. The method according to claim 1, further comprising:
   when camping on the cell of the first network node, initiating, by the user equipment, random access to the first network node, and establishing a radio resource control connection to the first network node; and
   sending, by the user equipment, cell information of the at least one selected to-be-connected cell to the first network node, wherein a time at which the cell information of the to-be-connected cell is sent may be any one of the following times:
      a time at which random access code is sent to the first network node,
      a time at which a radio resource control connection request message is sent to the first network node,
      a time at which a radio resource control connection complete message is sent to the first network node, and
      a time before which a measurement configuration sent by the first network node is received.

3. The method according to claim 2, wherein after establishing, by the user equipment, a radio resource control connection to the first network node, the method further comprises:
   receiving, by the user equipment, cell identifier information and a bearer configuration parameter that are of a second cell and that are sent by the first network node, wherein the second cell is a cell determined in the at least one to-be-connected cell by the first network node according to the cell information of the at least one to-be-connected cell; and
   establishing, by the user equipment according to the cell identifier information and the bearer configuration parameter of the second cell, a data radio bearer to a second network node corresponding to the second cell.

4. The method according to claim 2, wherein after establishing, by the user equipment, a radio resource control connection to the first network node, the method further comprises:
   receiving, by the user equipment, a radio resource control connection release message from the first network node, wherein the radio resource control connection release message carries cell identifier information of a second cell, wherein the second cell is a cell determined in the at least one to-be-connected cell by the first network node according to the cell information of the at least one to-be-connected cell; and
   establishing, by the user equipment, a data radio bearer and a radio resource control connection to a second network node corresponding to the second cell.

5. The method according to claim 1, further comprising:
   when camping on the cell of the first network node, determining, by the user equipment, a second cell from the at least one to-be-connected cell; and
   establishing, by the user equipment, a data radio bearer and a radio resource control connection to a second network node corresponding to the second cell.

6. The method according to claim 1, further comprising:
   when camping on the cell of the first network node, determining, by the user equipment, a second cell from the at least one to-be-connected cell according to cell information of the at least one to-be-connected cell;
   establishing, by the user equipment, a radio resource control connection to a second network node corresponding to the second cell; and
   establishing, by the user equipment, a data radio bearer to the first network node.

7. The method according to claim 1, wherein:
   the measurement instruction information comprises: physical cell identifiers and/or frequencies of the neighboring cells; and
   measuring, by the user equipment in the RRC-IDLE mode, the neighboring cells according to the measurement instruction information, and obtaining measurement results comprises:
      measuring, by the user equipment in the RRC-IDLE mode, reference signals of cells corresponding to the physical cell identifiers and/or the frequencies, and obtaining strength and/or quality of the reference signals, or
      measuring, by the user equipment in the RRC-IDLE mode, discovery signals of cells corresponding to the physical cell identifiers and/or the frequencies, and obtaining signal to interference plus noise ratios of the discovery signals.

8. The method according to claim 7, wherein the measurement instruction information further comprises:
   configuration information of reference signals that need to be measured, and the reference signals measured by the user equipment are reference signals corresponding to the configuration information of the reference signals that need to be measured; or
   configuration information of discovery signals that need to be measured, and the discovery signals measured by the user equipment are discovery signals corresponding to the configuration information of the discovery signals that need to be measured.

9. The method according to claim 7, wherein:
   the connection indication information comprises: a cell reselection criterion; and selecting, by the user equipment, at least one to-be-connected cell from the neighboring cells according to the connection indication information and the measurement results comprises:
  selecting, by the user equipment, from the neighboring cells, a to-be-connected cell whose reference signal has strength and/or quality that satisfies the cell reselection criterion, or
  selecting, by the user equipment, from the neighboring cells, a to-be-connected cell whose discovery signal has a signal to interference plus noise ratio that satisfies the cell reselection criterion.

10. The method according to claim 7, wherein:
the connection indication information comprises at least one of the following information: a minimum strength threshold of a reference signal that a to-be-connected cell needs to satisfy, a minimum quality threshold of a reference signal that a to-be-connected cell needs to satisfy, a minimum signal to interference plus noise ratio threshold of a discovery signal that a to-be-connected cell needs to satisfy, and a maximum quantity N of to-be-connected cells allowed to be selected; and
selecting, by the user equipment, at least one to-be-connected cell from the neighboring cells according to the connection indication information and the measurement results comprises:
  selecting, by the user equipment, from the neighboring cells, at least one to-be-connected cell that satisfies at least one condition of the following conditions, wherein the conditions comprise:
    strength of a reference signal is greater than or equal to the minimum strength threshold of a reference signal,
    quality of a reference signal is greater than or equal to the minimum quality threshold of a reference signal,
    a signal to interference plus noise ratio of a discovery signal is greater than or equal to the minimum signal to interference plus noise ratio threshold of a discovery signal,
    being comprised in N measured neighboring cells whose reference signals have greatest strength,
    being comprised in N measured neighboring cells whose reference signals have best quality, and
    being comprised in N neighboring cells whose discovery signals have greatest signal to interference plus noise ratios.

11. User equipment for use in an RRC-IDLE mode and for camping on a cell of a first network node, the user equipment comprises:
  a receiver configured to receive a message sent by the first network node, wherein the message comprises measurement instruction information and connection indication information, the measurement instruction information is used to instruct the user equipment to measure neighboring cells, the connection indication information is used to indicate a condition that a cell parameter of a to-be-connected cell needs to satisfy, the to-be-connected cell is comprised in the neighboring cells, and a network node corresponding to the to-be-connected cell can establish a connection to the user equipment; and
  a processor configured to:
    when the user equipment is in the RRC-IDLE mode, measure the neighboring cells according to the measurement instruction information received by the receiver, and obtain measurement results, and
    select at least one to-be-connected cell from the neighboring cells according to the connection indication information received by the receiver and the measurement results obtained by the processor, and keep the user equipment camping on the cell of the first network node when the user equipment is in the RRC-IDLE mode.

12. The user equipment according to claim 11, further comprising:
  a transmitter, configured to: when the user equipment camps on the cell of the first network node, initiate random access to the first network node, so that the user equipment establishes a radio resource control connection to the first network node, and send cell information of the at least one selected to-be-connected cell to the first network node, wherein a time at which the transmitter sends the cell information of the to-be-connected cell may be any one of the following times:
    a time at which random access code is sent to the first network node,
    a time at which a radio resource control connection request message is sent to the first network node,
    a time at which a radio resource control connection complete message is sent to the first network node, and
    a time before which the receiver receives a measurement configuration sent by the first network node.

13. The user equipment according to claim 12, wherein:
the receiver is further configured to receive cell identifier information and a bearer configuration parameter that are of a second cell and that are sent by the first network node, wherein the second cell is a cell determined in the at least one to-be-connected cell by the first network node according to the cell information of the at least one to-be-connected cell; and
the processor is further configured to control, according to the cell identifier information and the bearer configuration parameter of the second cell that are received by the receiver, the user equipment to establish a data radio bearer to a second network node corresponding to the second cell.

14. The user equipment according to claim 12, wherein:
the receiver is further configured to receive a radio resource control connection release message from the first network node, wherein the radio resource control connection release message carries cell identifier information of a second cell, wherein the second cell is a cell determined in the at least one to-be-connected cell by the first network node according to the cell information of the at least one to-be-connected cell; and
the processor is further configured to control, according to the cell identifier information of the second cell that is received by the receiver, the user equipment to establish a data radio bearer and a radio resource control connection to a second network node corresponding to the second cell.

15. The user equipment according to claim 11, wherein the processor is further configured to: when the user equipment camps on the cell of the first network node, determine a second cell from the at least one to-be-connected cell, and control the user equipment to establish a data radio bearer and a radio resource control connection to a second network node corresponding to the second cell.

16. The user equipment according to claim 11, wherein the processor is further configured to:

when the user equipment camps on the cell of the first network node, determine a second cell from the at least one to-be-connected cell according to cell information of the at least one to-be-connected cell; and control the user equipment to establish a radio resource control connection to a second network node corresponding to the second cell, and control the user equipment to establish a data radio bearer to the first network node.

17. The user equipment according to claim 11, wherein:
the measurement instruction information comprises:
physical cell identifiers and/or frequencies of the neighboring cells; and
the processor is further configured to:
when the user equipment is in the RRC-IDLE mode, measuring, by the processor according to the measurement instruction information received by the receiver, reference signals of cells corresponding to the physical cell identifiers and/or the frequencies, and obtaining strength and/or quality of the reference signals, or
when the user equipment is in the RRC-IDLE mode, measuring, by the processor according to the measurement instruction information received by the receiver, discovery signals of cells corresponding to the physical cell identifiers and/or the frequencies, and obtaining signal to interference plus noise ratios of the discovery signals.

18. The user equipment according to claim 17, wherein the measurement instruction information further comprises:
configuration information of reference signals that need to be measured, and the reference signals measured by the processor are reference signals corresponding to the configuration information of the reference signals that need to be measured; or
configuration information of discovery signals that need to be measured, and the discovery signals measured by the processor are discovery signals corresponding to the configuration information of the discovery signals that need to be measured.

19. The user equipment according to claim 17, wherein:
the connection indication information comprises: a cell reselection criterion; and
selecting, by the processor, at least one to-be-connected cell from the neighboring cells according to the connection indication information and the measurement results comprises:
selecting, by the processor from the neighboring cells, a to-be-connected cell whose reference signal has strength and/or quality that satisfies the cell reselection criterion, or
selecting, by the processor from the neighboring cells, a to-be-connected cell whose discovery signal has a signal to interference plus noise ratio that satisfies the cell reselection criterion.

20. The user equipment according to claim 17, wherein:
the connection indication information comprises at least one of the following information: a minimum strength threshold of a reference signal that a to-be-connected cell needs to satisfy, a minimum quality threshold of a reference signal that a to-be-connected cell needs to satisfy, a minimum signal to interference plus noise ratio threshold of a discovery signal that a to-be-connected cell needs to satisfy, and a maximum quantity N of to-be-connected cells allowed to be selected; and
selecting, by the processor, at least one to-be-connected cell from the neighboring cells according to the connection indication information and the measurement results comprises:
selecting, by the processor from the neighboring cells, at least one to-be-connected cell that satisfies at least one condition of the following conditions, wherein the conditions comprise:
strength of a reference signal is greater than or equal to the minimum strength threshold of a reference signal,
quality of a reference signal is greater than or equal to the minimum quality threshold of a reference signal,
a signal to interference plus noise ratio of a discovery signal is greater than or equal to the minimum signal to interference plus noise ratio threshold of a discovery signal,
being comprised in N measured neighboring cells whose reference signals have greatest strength,
being comprised in N measured neighboring cells whose reference signals have best quality, and
being comprised in N neighboring cells whose discovery signals have greatest signal to interference plus noise ratios.

* * * * *